United States Patent
Arakida

(10) Patent No.: US 7,116,879 B2
(45) Date of Patent: Oct. 3, 2006

(54) OPTICAL WAVEGUIDE, LIGHT SOURCE MODULE, AND OPTICAL INFORMATION PROCESSING APPARATUS

(75) Inventor: Takahiro Arakida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/987,387

(22) Filed: Nov. 12, 2004

(65) Prior Publication Data

US 2005/0105868 A1  May 19, 2005

(30) Foreign Application Priority Data

Nov. 17, 2003  (JP) ............................ P2003-386686

(51) Int. Cl.
*G02B 6/10*  (2006.01)
(52) U.S. Cl. ....................... 385/129; 385/130; 385/140
(58) Field of Classification Search ..................... None
See application file for complete search history.

(56) References Cited

U.S. PATENT DOCUMENTS

| | | | | |
|---|---|---|---|---|
| 6,321,007 | B1 * | 11/2001 | Sanders ........................ 385/37 |
| 6,724,140 | B1 * | 4/2004 | Araki ........................ 313/504 |
| 6,895,135 | B1 * | 5/2005 | Kaneko et al. ................ 385/14 |
| 2002/0118907 | A1 * | 8/2002 | Sugama et al. ................ 385/14 |
| 2005/0008317 | A1 * | 1/2005 | Kuramoto et al. ........... 385/129 |

* cited by examiner

*Primary Examiner*—John D. Lee
*Assistant Examiner*—Omar Rojas
(74) *Attorney, Agent, or Firm*—Robert J. Depke; Rockey, Depke, Lyons & Kitzinger LLC.

(57) ABSTRACT

The present invention is to provide an optical waveguide capable of allowing a desired incident light to efficiently propagate towards the light emission side and to emit therefrom, and capable of preventing unnecessary incident light from propagating, and in providing a light source module and an optical information processing apparatus using the optical waveguide. The optical waveguide comprises a bonded member of a substrate, a core layer and cladding layers, configured to introduce an incident line coming into the core layer toward a light emission side thereof. A metal layer for preventing the incident light coming into the cladding layer from propagating to the light emission side is formed in a pattern intercepting a sectional plane of light transmission of said cladding layer.

1 Claim, 34 Drawing Sheets

ENLARGED VIEW OF PORTION C

INCIDENT LIGHT (FROM THREE LIGHT SOURCES OF COLORS R, G, B)

$0° < \theta < 90°$

OPTICAL WAVEGUIDE, LIGHT SOURCE MODULE, AND OPTICAL INFORMATION PROCESSING APPARATUS

CROSS REFERENCES TO RELATED APPLICATIONS

The present document is based on Japanese Priority Document JP 2003-386686, filed in the Japanese Patent Office on Nov. 17, 2003, the entire contents of which being incorporated herein by reference.

BACKGROUND OF THE INVENTION

1. Technical Field

The present invention relates to an optical waveguide comprising a bonded member of a core layer and cladding layers, suitable for light source module, optical interconnection, optical communication and so forth, and also to an optical information processing apparatus such as display.

2. Description of Related Art

Heretofore, mainly electric signals have taken part in information transmission over relatively short distances, typically between boards in a single electronic instrument, and between chips on a single board, in which further increase in signal speed and in density of signal wirings will be necessary in order to upgrade performances of integrated circuits. It is, however, difficult for electric signal wirings to increase the signal speed and density of the electric signal wirings, due to problems in occurrence of signal delay or generation of noise ascribable to time constant of the wirings.

Optical interconnection now attracts a public attention as one solution for these problems. The optical interconnection is applicable to various sites such as between electronic instruments, between boards in a single electronic instrument, and between chips on a single board. For the purpose of a short-distance signal transmission such as between chips for example, an optical transmission communication system can be constructed by forming, on a substrate on which the chips are mounted, an optical waveguide which is used as a transmission line for a signal-modulated laser light and so forth.

On the other hand, there is known use of the optical waveguide as a light source module of a display. For example, there is developed a head-mounted display by which a user can enjoy movie software, game, computer screen, and cinema on its own large screen, and this realizes a personal display with which the user can readily enjoy a highly realistic movie anytime anywhere, simply by wearing it like a sunglasses (see U.S. Pat. No. 5,467,104).

The head-mounted display uses red, green and blue light-emitting diodes (LEDs) as the light sources, in which the LED light lacks coherency, has a wide angle of radiation, and is difficult to be multiplexed through condensation of three colors of light. There is known a technique of producing a uniform white light by multiplexing three colors of LED light through an optical waveguide (Nikkei Electronics, Mar. 31, 2003 Issue, p.127).

There is also known an optical waveguide 183 having a structure shown in FIG. 39 (see Patent Document 1, described later).

The optical waveguide 183 is configured, as shown in FIG. 39A and FIG. 39B, so that a cladding layer 102 of 0.5 μm thick, typically composed of InP, is formed on an InP substrate 101 of a predetermined thickness composed of a semiconductor substrate or a dielectric substrate, and a core layer 106 composed of InGaAs, having a width on an incidence surface 127 side of 50 μm and a width on an emission surface 135 side of 2 μm, and also having straight inclined surfaces 155, is formed further thereon.

A cladding layer 105 of 1 μm thick, typically composed of InP, is further formed so as to cover the cladding layer 102 and the core layer 106, to thereby configure the optical waveguide 183.

As shown in FIG. 39C, when a laser 169 (any color allowable) as an exemplary light source is disposed on the incidence side of the optical waveguide 183 on the cladding layer 102, and the light beam emitted from the laser 169 enters the core layer 106 through the incidence surface 127, the light beam narrows its range of spreading and is condensed in accordance with changes in the width of the core layer 106 as indicated by a very thick line, and is then emitted through the emission surface 135 to the external.

As another conventional example, there is also known an optical waveguide 184 having a structure shown in FIG. 40 (see Patent Document 2, described later).

In this example, the optical waveguide 184 has a double-layered structure having a core layer 106 through which the light propagates and a cladding layer 143, in which the core layer 106 in a square form is configured to fill a recess provided to the top surface of the cladding layer 143 having a nearly square form. The cladding layer 143 also serves as a substrate for holding the core layer 106, and contains a light absorbing agent 122 for absorbing the light propagating through the core layer 106 and/or light scattering intercepting agent and so forth.

As a still another conventional example, there is known an optical waveguide 184 having a structure shown in FIG. 41 (see Patent document 3, described later).

This example comprises a substrate 142 mounted in an optical waveguide module package 151, an optical waveguide 185 composed of a cladding layer 143 and a core layer 106, both of which being formed in predetermined geometries on the substrate 142, an LED 141 mounted at a predetermined position on the substrate 142, an optical fiber mounting portion 150 formed on the substrate 142, a wavelength division multiplexing (WDM) filter 148 formed in contact with the substrate 142, and a photodiode mounting carrier 147 disposed behind the WDM filter 148, in which the photodiode mounting carrier 147 has a photodiode element 146, and the WDM filter 148 has a metal film 149 vacuum-evaporated thereon and a pinhole 145 formed nearly at the center of the filter 148.

In thus-configured optical waveguide 185, a part of the light emitted from the LED 141 enters the optical waveguide 185 for the LED, and propagates in the optical waveguide 185. The light propagated in the optical waveguide 185 is totally reflected on the WDM filter 148, and then enters an optical fiber transmission line (not shown) through the optical waveguide 185 for the optical fiber.

The light from the transmission line composed of the optical fiber 140 enters the optical waveguide 185 for the optical fiber from the optical fiber 140, goes through the pinhole 145 of the WDM filter 148, and is received by the photodiode element 146.

[Patent Document 1] Japanese Patent Application Publication (KOKAI) No. HEI 5-173036 (p.2, right column, L.17 to p.3, left column, L.8, FIG. 1d, FIG. 1e)

[Patent Document 2] Japanese Patent Application Publication (KOKAI) No. HEI 2-87102 (p.2, right column, L.29 to p.3, left column, L.40, FIG. 2)

[Patent Document 3] Japanese Patent Application Publication (KOKAI) No. 2001-305365 (p.3, right column, L.34 to p.4, left column, L.22, FIG. 1).

However, typically in the conventional example shown in FIG. 39, use of an LED (light-emitting diode) as a light source in place of the laser 169 results in entering of the emitted light from the light source not only into the core layer 106 but also into the cladding layers 102, 105, due to a diffusing tendency of the LED light unlike the laser light, and the light then propagates through them, and goes out from the sectional surfaces of the individual cladding layers on the emission surface 135 side of the core layer 106.

The emitted light from the core layer 106 is therefore undesirably mixed with the emitted light from the cladding layers 102, 105, and makes it difficult to recognize the clear emitted light from the core layer 106, and this results in increase in diameter of the beam which should be a point light source, and makes it unacceptable for use in optical communication or display.

In the conventional example shown in FIG. 40 having the light absorbing agent 122 added to the entire portion of the cladding layer 143, the light which enters the core layer 106 and propagates therethrough while being reflected on the interface with the cladding layer 143 may be worsened in terms of light propagation loss.

In addition, mixing of carbon powder or the like into the cladding layer 143 may form regions having different refractive indices at the interface between the core layer 106 and the cladding layer 143, because the light absorbing agent 122 is less likely to uniformly distribute in the cladding layer 143, and this sort of non-uniformity in the mixing may locally modify the propagation loss and so forth of the waveguide 184.

In the conventional example shown in FIG. 41, which is the module package 151 allowing the send and receive operations at the same time by making wavelengths of the sent light and received light differ from each other, any roundabout of the incident light from the LED 141 into the photodiode element 146 is causative of noise for the light in the optical fiber 140, and this degrades the receiving characteristics of the module package.

It is known that efficiency of incidence of the emitted light from the LED 141 into the optical waveguide 185 is as much as 50% in maximum, and the residual emitted light from the LED 141 not entered the optical waveguide 185 propagates as a stray light in the air or in the cladding layer 143 in adjacent to the optical waveguide 185.

The pinhole 145 of the WDM filter 148 is provided in order to prevent the stray light from entering the photodiode element 146, after transmitting through the WDM filter 148, to thereby avoid degradation of the receiving characteristics.

However, even if any effort of eliminating the propagating light (stray light) in the cladding layer 143 should be made by providing the WDM filter 148, having the pinhole 145 formed therein, at the end surface on the light emission side of the optical waveguide 185, difficulty and labor-consuming nature of alignment between the pinhole 145 and the emission surface of the core layer 106 tends to result in misalignment, and this is not only causative of degradation of the receiving characteristics, but also degrade productivity of the module package 151 using the WDM filter 148.

The WDM filter 148 can intercept wavelength region of the emitted light from the LED 141, which is a major component of the stray light, but cannot completely intercept the stray light incident at large angles. Provision of the metal film 149 composed of, for example, CrO or the like, having a light reflectivity and light absorbency, on the light incident side of the WDM filter 148 may be one possible countermeasure, but this will increase the process steps.

Provision of a groove having a predetermined width so as to be laid in a direction crossing the direction of propagation of light, and so as to be extended over the optical waveguide 185, the cladding layer 143 and the substrate 142, and insertion of a metal plate having a pinhole, configured similarly to the WDM filter 148, will be hopeful to give a similar effect with the WDM filter 148, but this discontinues the optical waveguide 185, and consequently results in degradation of light propagation performance of the core layer 106.

SUMMARY OF THE INVENTION

The present invention is conceived after considering the above-described situation, and objects thereof reside in providing an optical waveguide capable of allowing a desired incident light to efficiently propagate towards the light emission side and to emit therefrom, and capable of preventing unnecessary incident light from propagating, and in providing a light source module and an optical information processing apparatus using the optical waveguide.

The present invention relates to an optical waveguide comprising a bonded member of a core layer and a cladding layer, and being configured so as to guide the light coming into the core layer towards a light emission side thereof, in which light propagation preventive means for preventing the incident light coming into the cladding layer from propagating therethrough towards the light emission side is formed in a pattern which intercepts a sectional plane of light transmission of the cladding layer, and is also to provide a light source module having the optical waveguide and a light source for introducing light into the optical waveguide, and is still also to provide an optical information processing apparatus having light receiving means for receiving the light emitted from the optical waveguide.

Because the light propagation preventive means for preventing the light incident to the cladding layer from propagating towards the light emission side is formed in a pattern which intercepts the sectional plane of light transmission of the cladding layer, the optical waveguide according to the present invention is successful in preventing propagation of the incident light which enters the cladding layer at various angles, with the aid of the light propagation preventive means, and allows only the light enters the cladding layer to propagate towards the light emission side, so that the emitted light from the cladding layer will never occur in the emitted light from the core layer, and this makes it possible to emit clear light having a desired size and energy from the core layer.

It is also made possible to configure the optical information processing apparatus based on use of the emitted light having a desired spot size, by providing the optical waveguide with a light source for introducing signal lights to the optical waveguide, and with light receiving means for receiving the emitted light from the optical waveguide.

In the present invention, the light propagation preventive means can extend between opposing edges or on a diagonal line between opposing angles in a width-wise direction and a thickness-wise direction of the cladding layer so as to penetrate therethrough, in order to prevent the incident light coming into the cladding layer from propagating therethrough towards the light emission side of the cladding layer.

Moreover, the light propagation preventive means may also be provided only partially between the opposing edges or on the diagonal line between the opposing angles in the width-wise direction and thickness-wise direction of the cladding layer, in order to prevent the incident light coming into the cladding layer from propagating therethrough towards the light emission side of the cladding layer.

Moreover, it is also allowable that the partially-provided light propagation preventive means comprises first continuous layers extending respectively from the opposing edges or from the opposing angles, and a second continuous layer provided inside the opposing edges, so that the first and second continuous layers overlap with each other with respect to a direction of propagation of light, in order to prevent the incident light coming into the cladding layer from propagating therethrough towards the light emission side of the cladding layer.

The light propagation preventive means is preferably embedded in the cladding layer, but preferably does not substantially reside at an interface with the core layer.

For a purpose of ensuring a desirable color balance of the emitted light from the core layer for light emission, it is preferable to provide a plurality of core layers corresponding to a plurality of the light sources differing in the light intensity, as being configured so that the core layers can uniformly multiplex the individual incident light on the light emission side thereof.

It is also preferable that the light propagation preventive means is disposed at least on the light emission side of a confluent point of the plurality of core layers, in order to prevent the light coming into the cladding layer from propagating therethrough towards the light emission side of the cladding layer.

It is also allowable that the core layer is formed on the cladding layer, which serves as a support, in order to keep the geometry of the core layer, and that another cladding layer is formed on the core layer in order to protect the core layer.

Also the above-described another cladding layer is preferably provided with the light propagation preventive means, in order to prevent the incident light coming into this another cladding layer from propagating therethrough towards the light emission side of this another cladding layer.

The light propagation preventive means is preferably composed of a metal, semimetal or semiconductor having light absorbency and/or light reflectivity, so as to prevent the incident light coming into the cladding layer from propagating therethrough towards the light emission side of the cladding layer.

The above-described optical waveguide can be used as a light source module if combined with a light source for introducing light to the optical waveguide.

The optical waveguide can also be used for condensing light from a light source such as light-emitting diode, laser light and so forth.

The core layer is preferably formed using a photocurable resin. The reason why is that light (particularly ultraviolet radiation) irradiation can facilitate patterning of the core layer as being corresponded to light exposure pattern, and also that the resin is advantageous as a material for composing the cladding layer. This sort of photocurable resin can be exemplified by a polymer organic material such as oxethane resin described in Japanese Patent Application Publication (KOKAI) 2000-356720. This sort of the polymer organic material is preferably such as having a transmissivity of 90% or more for the visible light having a wavelength of 390 nm or shorter. Materials for composing the core and clad may not only be the photocurable resin, but may also be an inorganic material.

A material available for composing the optical waveguide may be an oxethane resin composed of an oxethane compound having an oxethane ring, or polysilane composed of an oxyrane compound having an oxyrane ring, in which it is preferable to use a composition containing a cationic polymerization initiator which can initiate polymerization based on a chain reaction, for the purpose of proceeding photocuring (polymerization) of these materials.

The present invention is advantageously applicable to a display configured so that a predetermined flux of light can efficiently be condensed by the optical waveguide and can be emitted therefrom, or so that a signal light efficiently introduced into the optical waveguide and emitted therefrom is further scanned by scanning means to be projected, or also applicable to an optical information processing apparatus typically used for optical communication, configured so as to introduce the aforementioned light into a light receiving element (optical interconnection, photo-detector, etc.) of a circuit in the succeeding stage.

BRIEF DESCRIPTION OF THE DRAWINGS

FIG. 37A to FIG. 27C are sectional views of optical waveguides of still other examples according to the same;

DESCRIPTION OF PREFERRED EMBODIMENTS

Next paragraphs will specifically describe preferred embodiments of the present invention referring to the attached drawings.

<First Embodiment>

Figure 1A:
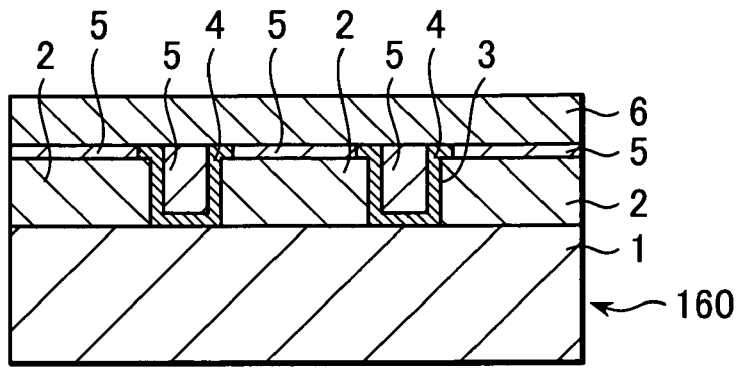
FIG. 1A is a sectional view taken along a line I—I in FIG. 1B.
Figure 1B:
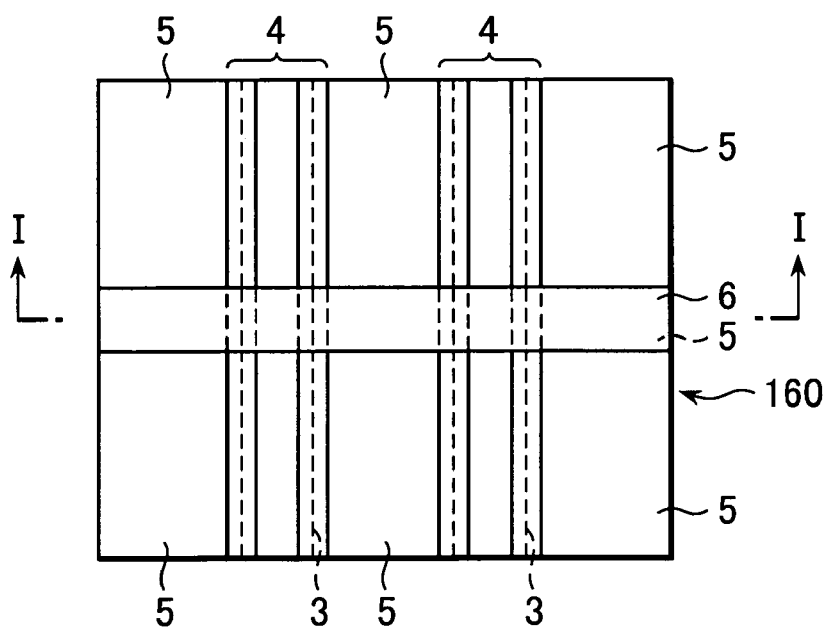
FIG. 1B is a plan view and FIG. 1C is a rear elevation of an optical waveguide according to a first embodiment of the present invention.
Figure 1C:
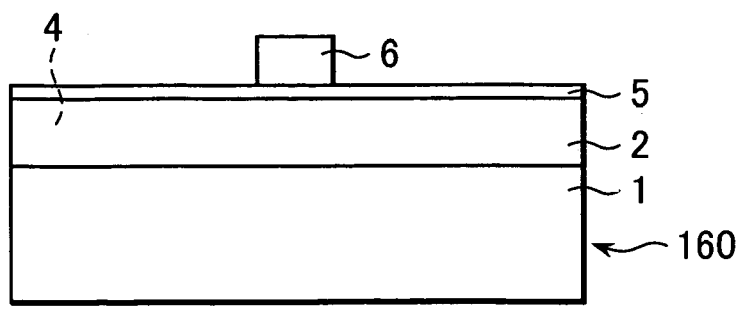

An optical waveguide of the present embodiment is configured, as shown in FIG. 1A as a sectional view taken along line I—I in a plan view of an optical waveguide 160, in FIG. 1B as a plan view, and in FIG. 1C as a side elevation, so that the a cladding layer 2, a cladding layer 5 and a core layer 6, respectively having a predetermined thickness, are formed in this order on a substrate 1 having a predetermined thickness and geometry, and metal layers 4 are disposed at two portions which extend over groove portions 3 formed in the cladding layer 2 and towards the cladding layer 5. It is to be noted that FIG. 1A is a sectional view taken along line I—I in the plan view shown in FIG. 1B. The optical waveguide herein is of air-ridge-type having a top surface and side faces of the core layer 6 exposed to the air.

The metal layers 4 have a nearly U-shape section opened upward, typically have a thickness of several tens of micrometers, and are provided two in parallel with each other in a direction perpendicular to a direction of propagation of light, as light propagation preventive means for preventing propagation of light within the cladding layer 2 and the cladding layer 5. Each of the metal layers 4 is continuously formed as being extended from one side faces of the cladding layer 2 and the cladding layer 5 to the other side faces of them, and over the entire range of the thickness-wise direction of the cladding layers (the same will apply also to the description below). The core layer 6 has a geometry narrower in a width-wise direction of the optical waveguide 160 than the substrate 1 and so forth.

In this configuration, polymer materials which differ in the refractive index from each other are sequentially stacked on the substrate 1, so as to form a stacked member which is composed of the patterned core layer 6 and the individual cladding layers 2 and 5. It is to be noted that the refractive index of the core layer 6 is larger than those of the cladding layers 2 and 5.

Figure 2A:
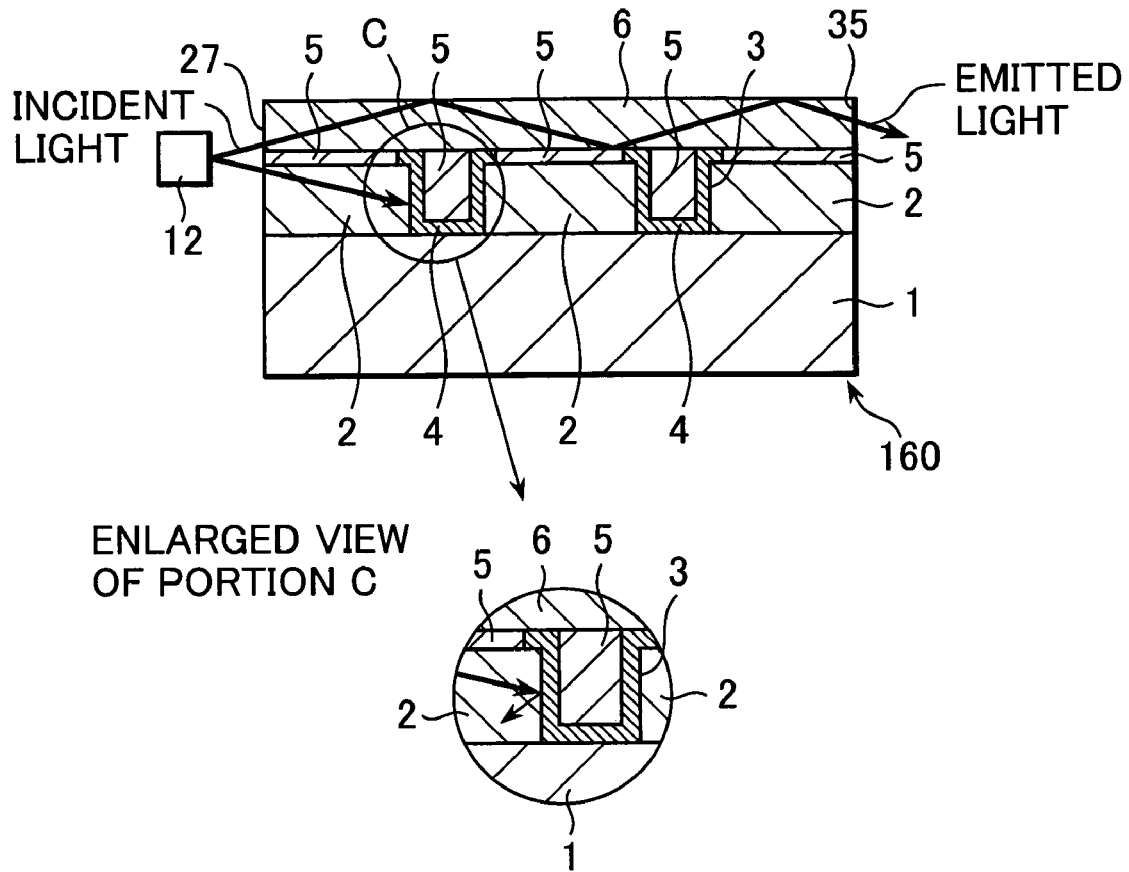
FIG. 2A is a sectional view taken along a line II—II in FIG. 2B
Figure 2B:
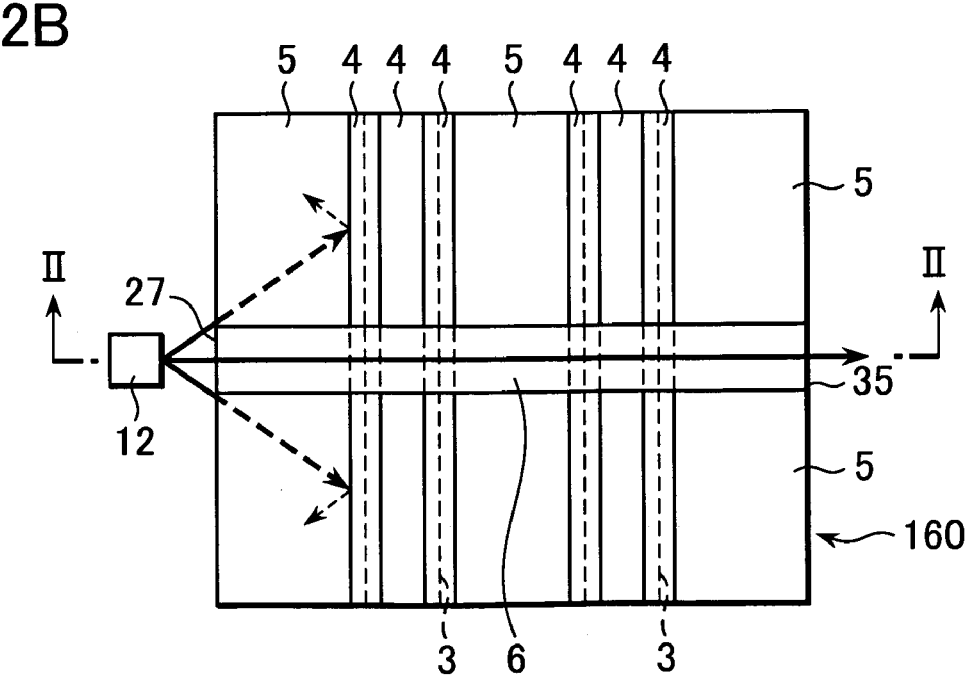
FIG. 2B is a plan view of the optical waveguide according to the same.

Next, as shown in FIG. 2A as a sectional view taken along line II—II of the optical waveguide 160 and in FIG. 2B as a plan view, an LED 12 is disposed as a light source on an incidence surface side of the core layer 6, cladding layer 2 and the cladding layer 5. It is to be noted that FIG. 2A is a sectional view taken along line II—II in the plan view of FIG. 2B.

Of the light components emitted from the LED 12, the one entered the core layer 6 from an incidence surface 27 of the core layer 6 reflects on an interface between the core layer 6 and the air, and on an interface between the core layer 6 and the cladding layer 5, because the core layer 6 has a refractive index larger than those of the air and the cladding layer 5, and emits as an emitted light from an emission surface 35 of the core layer. Although only one core layer 6 is illustrated in the present embodiment, the core layer 6 is provided in three sites in a practical mode of this embodiment to be applied to a display, wherein other two sites are not illustrated herein.

According to the present embodiment, light components having various angles of incidence from the LED 12 into the cladding layer 2 and the cladding layer 5 are absorbed by the metal layers 4 embedded in the cladding layer 2 and the cladding layer 5 so as to intercept their sectional planes of light transmission (the same will apply also to the description below), or reflected after colliding therewith, and are prevented from propagating further towards the light emission side of the cladding layer 2 and the cladding layer 5, so that only a light component entering the core layer 6 can propagate therethrough towards the light emission side, and this allows emission of a clear light from the core layer 6.

The metal layer 4 embedded in the cladding layers 2 and 5 contacts with the core layer 6 in only a small area at the interface between the core layer 6 and the cladding layer 5, and can keep a relatively good uniformity of the light reflectivity at the interface, rather than modifying it, and this makes it possible to keep a desirable light propagation property of the incident light entered the core layer 6.

Next paragraphs will describe process steps of fabrication of the optical waveguide 160 referring to sectional views of FIG. 3 to FIG. 3E and FIG. 4A to FIG. 4B, which are taken along the line I—I in FIG. 1, and plan views of FIG. 5A to FIG. 8.

Figure 3A:
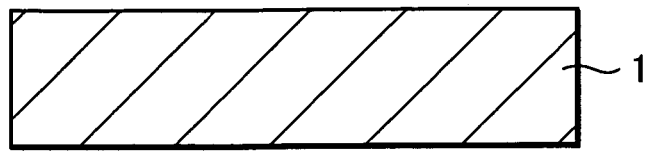
FIG. 3A to FIG. 3E are sectional views sequentially explaining fabrication steps of the optical waveguide according to the same.
Figure 3B:
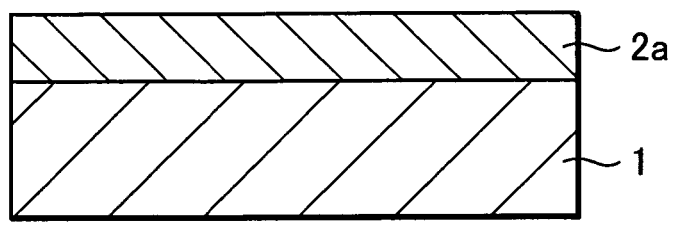
Figure 5A:
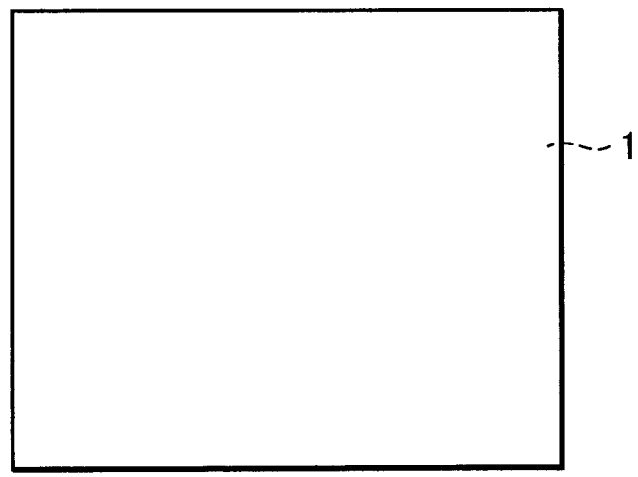
FIG. 5A and FIG. 5B are plan views sequentially explaining fabrication steps of the optical waveguide according to the same.
Figure 5B:
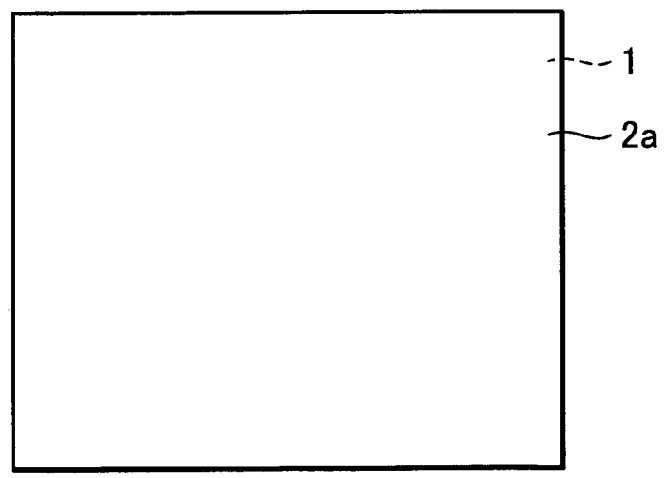

First, on the substrate 1 shown in FIG. 3A and FIG. 5A of a predetermined thickness, typically composed of silicon or glass, a clad material 2a composed of an organic material is coated so as to adjust a thickness after curing of 30 μm or around, for example, to thereby form a layer of the clad material 2a.

Component of the clad material 2a is preferably a photocurable resin, in which a photocurable resin composition comprising an oxethane resin, polysilane and a cationic polymerization initiator can typically be used, which is annealed after coating. The entire portion of the clad material 2a is then irradiated with ultraviolet radiation using, for example, a ultra-high-pressure mercury lamp, so as to allow the clad material 2a composed of an organic material to cure, to thereby form the cladding layer 2 having a refractive index of 1.51 or around. Complete curing of the clad material 2a will increase the refractive index by 0.025 or around.

Figure 3C:
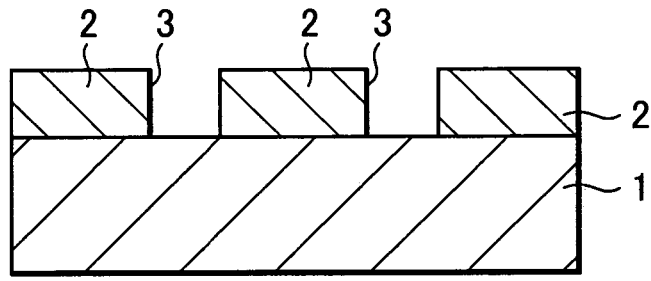
Figure 6A:
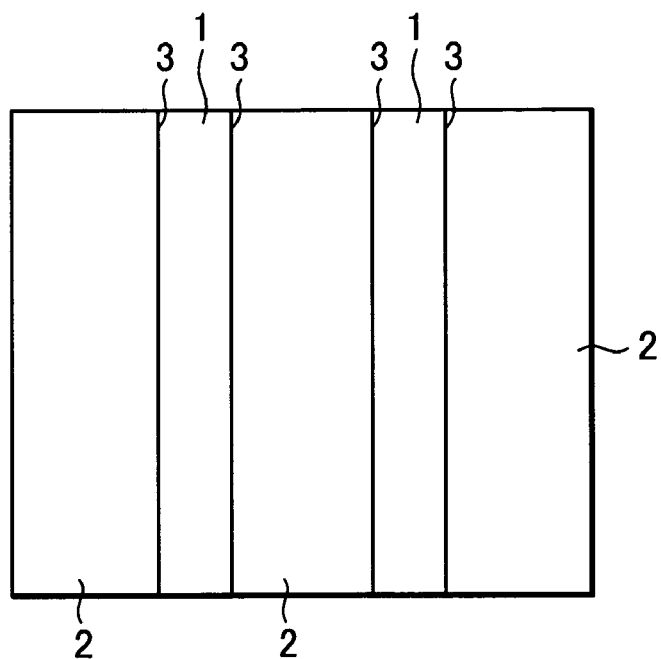
FIG. 6A and FIG. 6B are plan views sequentially explaining fabrication steps of the optical waveguide according to the same.

Next, as shown in FIG. 3C and FIG. 6A, the groove portions 3 of a predetermined width are formed at predetermined sites of the cladding layer 2 until the top surface of the substrate 1 exposes, by processing including patterning, dry etching and dicing. The groove portions 3 are formed as being continuously extended from one side face of the cladding layer 2 to the other side face thereof, in the direction perpendicular to the direction of propagation of light. The width of the groove portions 3 are set to approximately several tens of micrometers in view of simplicity of formation of the grooves.

Figure 3D:
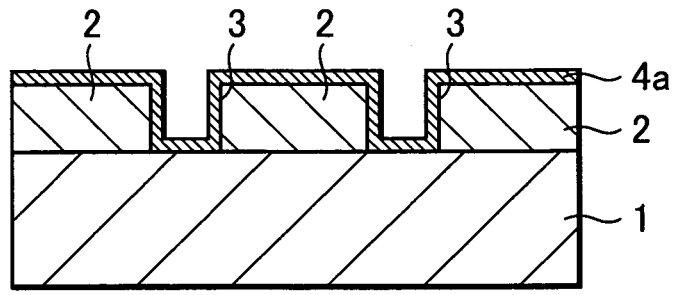
Figure 6B:
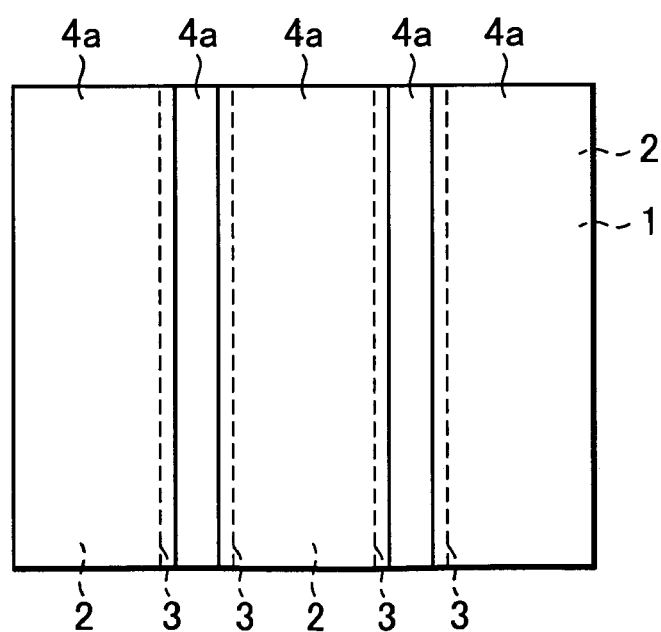

Next, as shown in FIG. 3D and FIG. 6B, a metal material 4a, a semiconductor material or the like for preventing propagation of light, having a predetermined thickness, is formed on an exposed surface of the cladding layer 2, the exposed surface of the substrate 1, and on the inner wall surface of the groove portions 3, by typically using means for forming photoresist or the like.

Figure 3E:
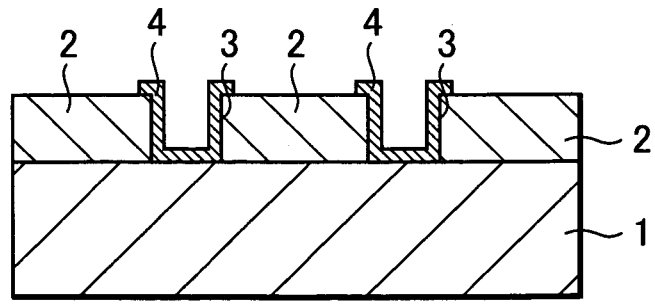
Figure 7A:
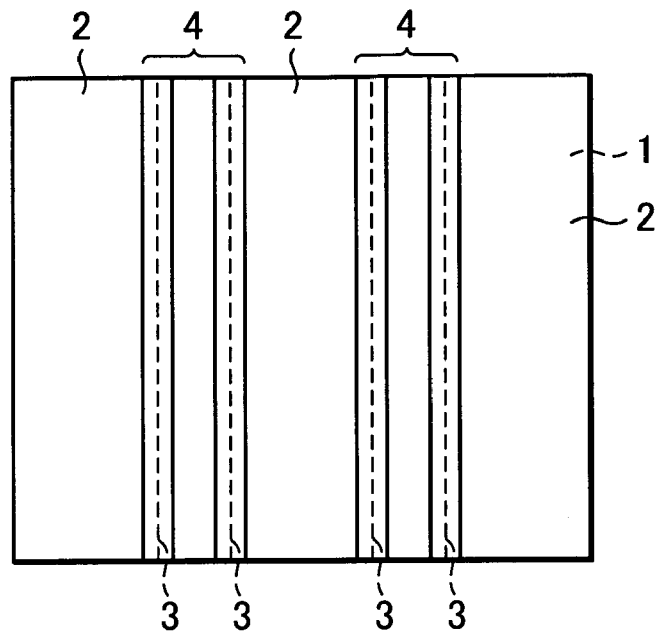
FIG. 7A and FIG. 7B are plan views sequentially explaining fabrication steps of the optical waveguide according to the same.

Next, as shown in FIG. 3E and FIG. 7A, the metal material 4a formed in the above-described process step is then processed into a predetermined geometry using processing means such as sputtering. This results in formation of the metal layer 4 having a nearly U shape opened upward, which is formed in the direction perpendicular to the direction of propagation of light, so as to continuously extend from one side face of the cladding layer 2 to the other side face thereof, in order to prevent the propagation of light within the cladding layer 2.

The upper portion of the metal layer 4 remains on the cladding layer 2, in which this portion can be removed by grinding so as to reduce an area of the metal layer 4 in contact with the interface between the cladding layer 5 and the core layer 6, to thereby make the refractive index at the interface uniform, and this makes it possible to keep desirable levels of light reflectivity and light propagation performance in the core layer 6.

Materials available for composing the metal layer 4, which is provided for preventing the light propagation in the cladding layer 2 and the cladding layer 5, include those having light absorbency or light reflectivity, exemplified by metal materials such as Al, Ti, Au, Pt, Ni and Cu, and semiconductor materials such as Si. The metal layer 4 provided at least only a single site in the cladding layer 2 and the cladding layer 5 can fully exhibit the preventive effect against light propagation, but it is also allowable to provide it in two or more sites.

Figure 4A:
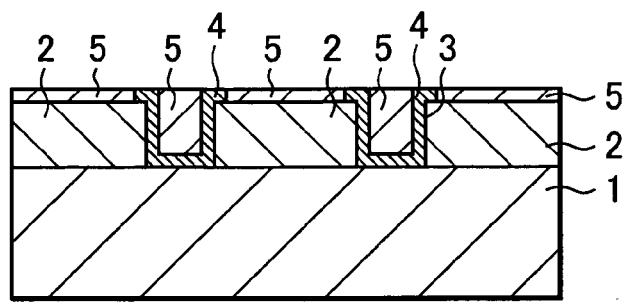
FIG. 4A and FIG. 4B are sectional views sequentially explaining fabrication steps of the optical waveguide according to the same.
Figure 7B:
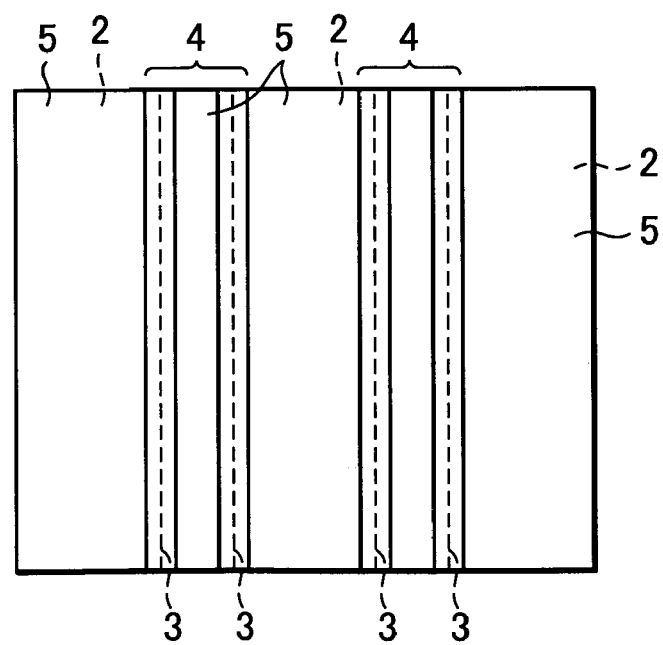

Next, as shown in FIG. 4A and FIG. 7B, a clad material is filled by deposition up to the height of the top portion of the metal layer 4 which remains on the cladding layer 2, to thereby form the cladding layer 5. Thus-formed cladding layer 5 can planarize the surface at a level of the top portion of the metal layer 4.

Material for composing the cladding layer 5 may be same as that used for the cladding layer 2, but it is more preferable to use a material having a refractive index largely differ from that of the core layer 6, in view of ensuring a desirable light propagation performance in the core layer 6. It is also allowable to fill a metal material if the metal layer 4 has only a small width of a top opening thereof.

Figure 4B:
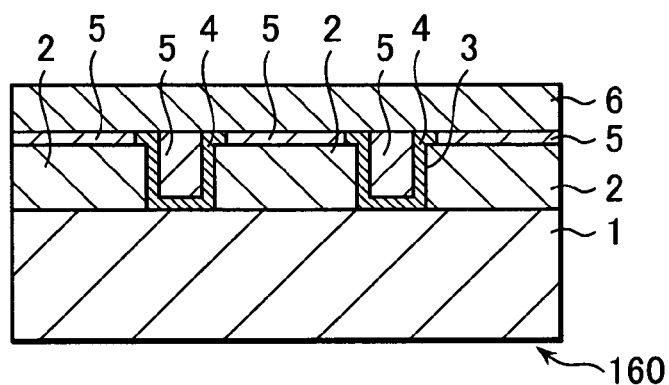
Figure 8:
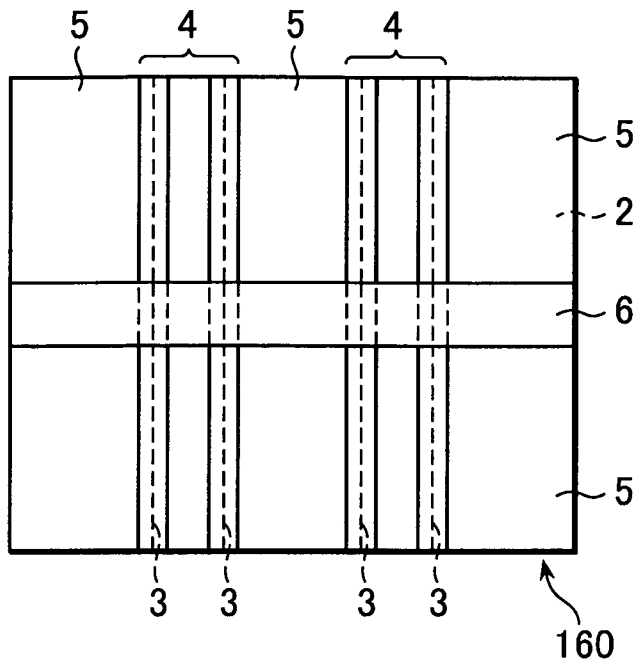
FIG. 8 shows a sectional view explaining a fabrication step of the optical waveguide according to the same.

Next, as shown in FIG. 4B and FIG. 8, a stripe-formed core layer 6, having a width narrower than that of the substrate 1 and so forth, is formed on the planarized cladding layer 5 and in the central portion of the optical waveguide 160. The core layer 6 is formed typically by coating a core material, composed of the photocurable resin composition similar to that described in the above, in a predetermined thickness on the cladding layer 5 to thereby form a layer of the core material, and by patterning it by a patterning process into a predetermined geometry.

In a typical method of forming the core layer 6, the core material is selectively irradiated by ultraviolet radiation through a photomask having an opening corresponding to a pattern of the core layer. This results in curing of the core material in the portion which falls in the opening of the photomask, and formation of the core layer 6 conforming to the above-descried pattern. Uncured portion of the core material which remained non-irradiated is then removed by solubilization. This also makes it possible to form the core layer 6 having a refractive index of 1.56 or around.

Thus-proceeded process steps of fabrication makes it possible to form the core layer 6 on the cladding layers 2 and 5, to thereby form the optical waveguide 160.

Figure 9:
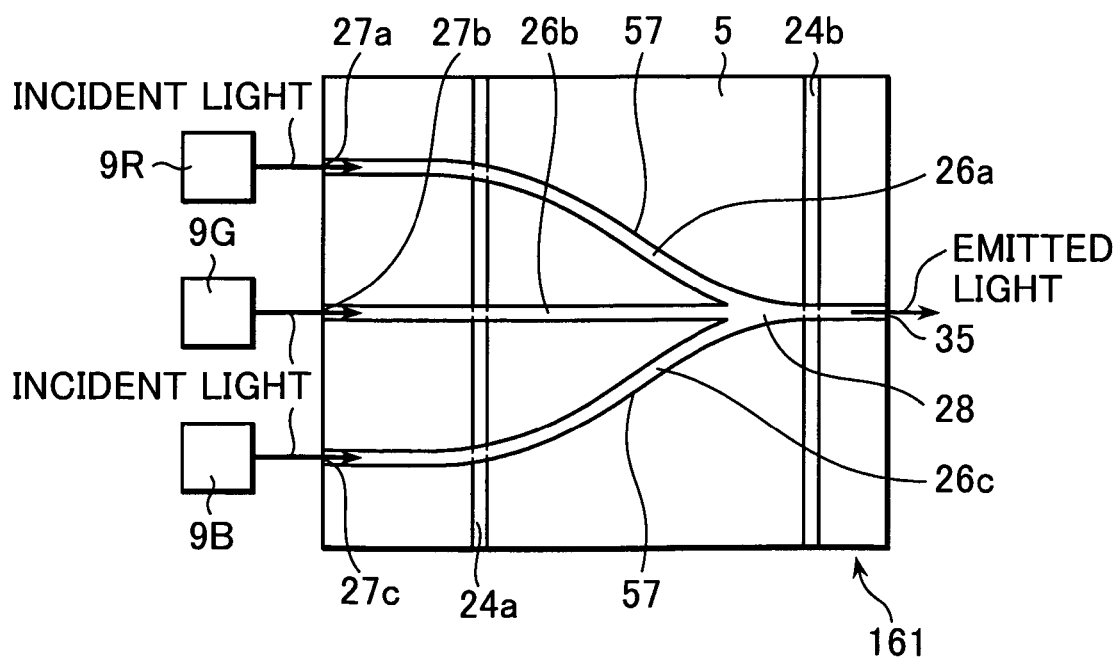
FIG. 9 is a plan view of another optical waveguide according to the same.

Next paragraphs will describe states of entrance and propagation of light in an optical waveguide 161 referring to FIG. 9.

The optical waveguide 161 shown in FIG. 9 partially adopts the structure of the optical waveguide 160, but is configured so that the core layer is divided into three core portions 26a, 26b and 26c partially composed of curved inclined surfaces 57, light sources 9R, 9G and 9B are disposed on the side of incidence surfaces 27a, 27b and 27c, respectively, and the core portions 26a and 26c are respectively made confluent with the core portion 26b on this side of the emission surface 35, to thereby guide the light through a common core portion 28 towards the emission surface 35 and allow the light to emit therefrom.

The individual incidence surfaces 27a, 27b and 27c of the individual core layers 26a, 26b and 26c are aligned on the same plane, the core portion 26b has a straight form, and the core portions 26a and 26c have the curved inclined surfaces 57 provided thereto.

Figure 10:
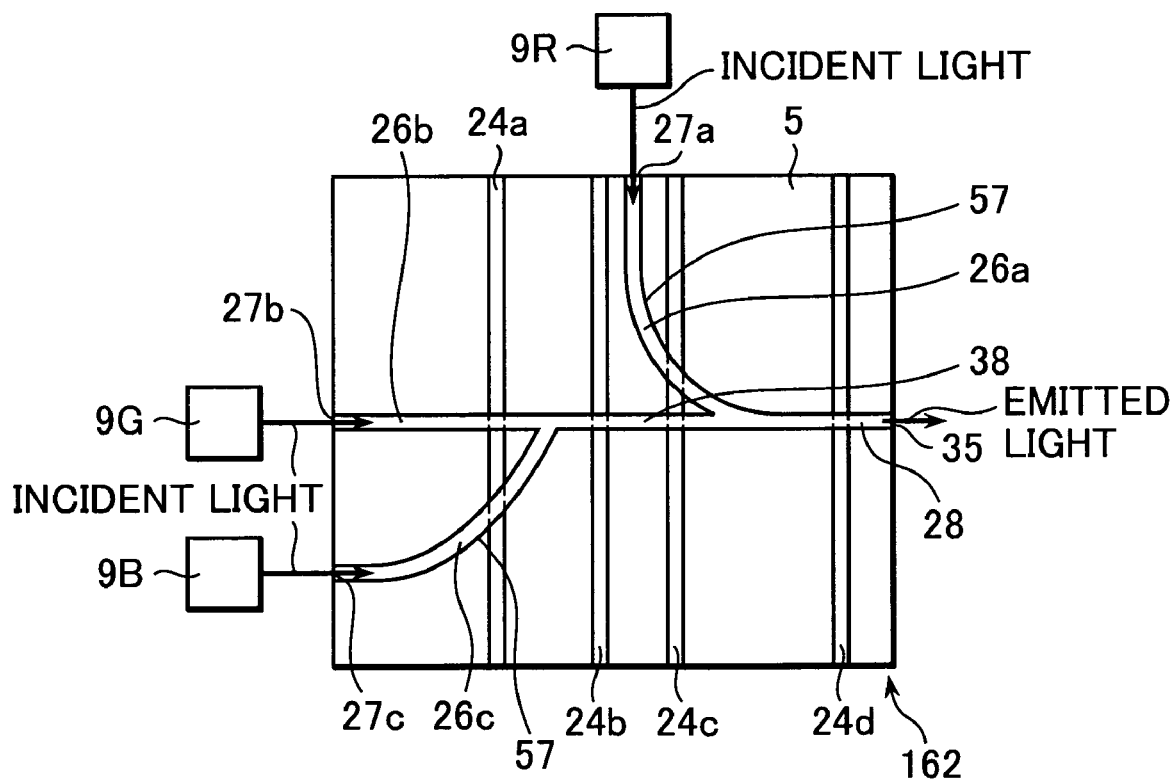
FIG. 10 is a plan view of still another optical waveguide according to the same.

A metal layer 24a is further provided between the individual incidence surfaces 27a, 27b and 27c and the common core portion 28, and a metal layer 24b is provided to the common core portion 28. The metal layer 24a and the metal layer 24b are configured and arranged similarly to the above-described metal layer 4, wherein FIG. 9 and later-described FIG. 10 give only simplified illustrations. It is not always necessary to provide the metal layer 24a.

Provision of the metal layer 24a between the individual incidence surfaces 27a, 27b and 27c and a confluent point of the core portions 26a, 26b and 26c, that is, one end of the common core portion 28 is successful in preventing propagation of light which entered the cladding layer 5 on the sides of the individual incidence surfaces 27a, 27b and 27c, and in allowing only the light propagating through the individual core portions 26a, 26b and 26c to propagate towards the common core portion 28.

Moreover, provision of the metal layer 24b between the confluent point being the one end of the common core portion 28 and the emission surface 35 is successful in preventing propagation of any light accidentally leaked typically from the individual core portions 26a, 26b, 26c or from the common core portion 28 into the cladding layer 5, and in allowing only the synthetic light from the individual core portions 26a, 26b and 26c to emit from the emission surface 35.

Next paragraphs will describe states of entrance and propagation of light in an optical waveguide 162 referring to FIG. 10.

The optical waveguide 162 shown in FIG. 10 partially adopts the structure of the optical waveguide 161, but is configured so that the core layer is divided into three core portions 26a, 26b and 26c partially composed of the curved inclined surfaces 57, three colors of light sources 9R, 9G and 9B are disposed on the side of the incidence surfaces 27a, 27b and 27c, respectively, the core portion 26c is made confluent with the core portion 26b on this side of the emission surface 35 to thereby form a common core portion 38, and the common core portion 38 is further made confluent with the core portion 26a so as to form the common core portion 28, to thereby guide the light through the common core portion 28 towards the emission surface 35 and allow the light to emit therefrom.

The individual incidence surfaces 27b and 27c of the core layers 26b and 26c are aligned on the same plane, whereas the incidence surface 27a of the core portion 26a resides on a plane different from the plane on which the individual incidence surfaces 27b and 27c are aligned. The core portion 26b has a straight form, whereas the core portions 26a and 26c have the curved inclined surfaces 57, wherein angle of the inclination is larger in the core portion 26a than in the core portion 26c.

In addition, the metal layer 24a is provided between the individual incidence surfaces 27b and 27c and a confluent point of the core portions 26b and 26c, that is, one end of the common core portion 38, the metal layer 24b is provided to the cladding layer 5 around the common core portion 38, the metal layer 24c is provided between the incidence surfaces 27a of the core portion 26a and a confluent point of the core portion 26a and the common core portion 28, that is, one end of the common core portion 28, and the metal layer 24d is provided between this confluent point and the emission surface 35.

Provision of the metal layer 24a between the individual incidence surfaces 27b and 27c and the one end of the common core portion 38 is successful in preventing propagation of light which entered the cladding layer from the side of the individual incidence surfaces 27b and 27c, and in allowing only the light propagating through the individual core portions 26b and 26c to propagate towards the common core portion 38.

Moreover, provision of the metal layer 24b to the common core portion 38 at a portion between the confluent point of the core portions 26b and 26c and the confluent point of the core portion 26a and the common core portion 28 is successful in preventing propagation of any light accidentally leaked from the common core portion 38 into the cladding layer 5, and in allowing only the synthetic light from the individual core portions 26b and 26c to propagate.

Moreover, provision of the metal layer 24c between the incidence surface 27a and the confluent point of the core portion 26a and the common core portion 28 is successful in preventing propagation of light entered the cladding layer 5 from the incidence surface 27a side, and in allowing only the light propagating in the core portion 26a to propagate towards the common core portion 28.

Moreover, provision of the metal layer 24d to the common core portion 28 at a portion between the confluent point of the core portions 26a and the common core portion 38 and the emission surface 35 is successful in preventing propagation of any light accidentally leaked from the common core portion 28 into the cladding layer 5, and in allowing only the synthetic light from the individual core portions 26a, 26b and 26c to emit from the emission surface 35.

The light sources 9R, 9G and 9B herein differ from each other in the intensity, wherein the intensity increases in the order of green, blue and red. Direct introduction of the light from the individual light sources into the core layer 6 will therefore result in a synthetic light of reddish tone. By taking some measure on the arrangement of the individual core portions 26a, 26b and 26c, and by making the individual curved inclined surfaces 57 of the core portions 26a and 26c different from each other, as shown in FIG. 10, it is made possible to equalize energies of the individual incident lights propagating towards the common core portion 28, and to synthesize an emitted light well balanced in the light intensity.

<Second Embodiment>

The present embodiment is similar to the above-described first embodiment, except that, in an optical waveguide 163 having the same configuration with the above-described optical waveguide 160, the end portion thereof is removed typically at an angle of inclination of 45° to thereby form an inclined surface 25, and in that the substrate 37 is composed of a material having a light transmissivity, as shown in FIG. 11 and FIG. 12.

Figure 11A:
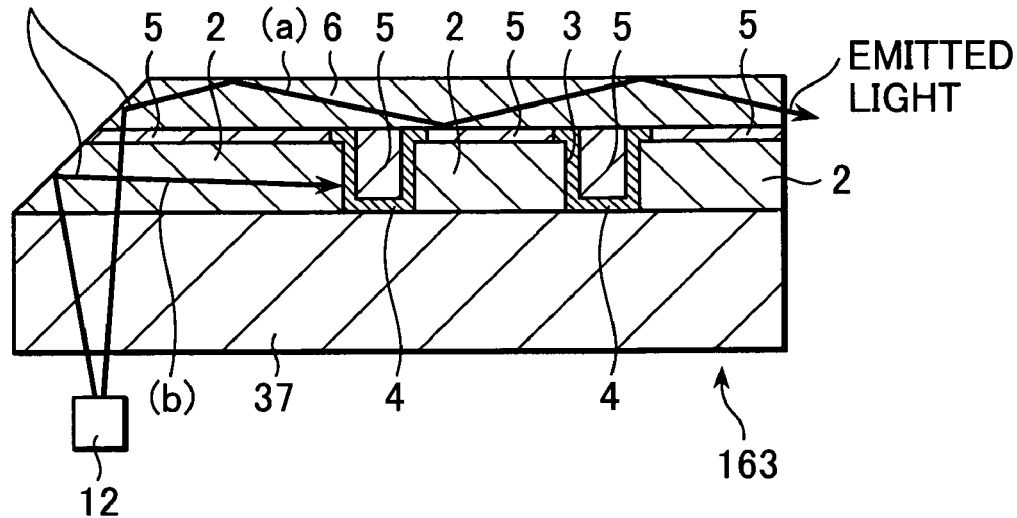
FIG. 11A is a sectional view taken along a line XI—XI in FIG. 11B
Figure 11B:
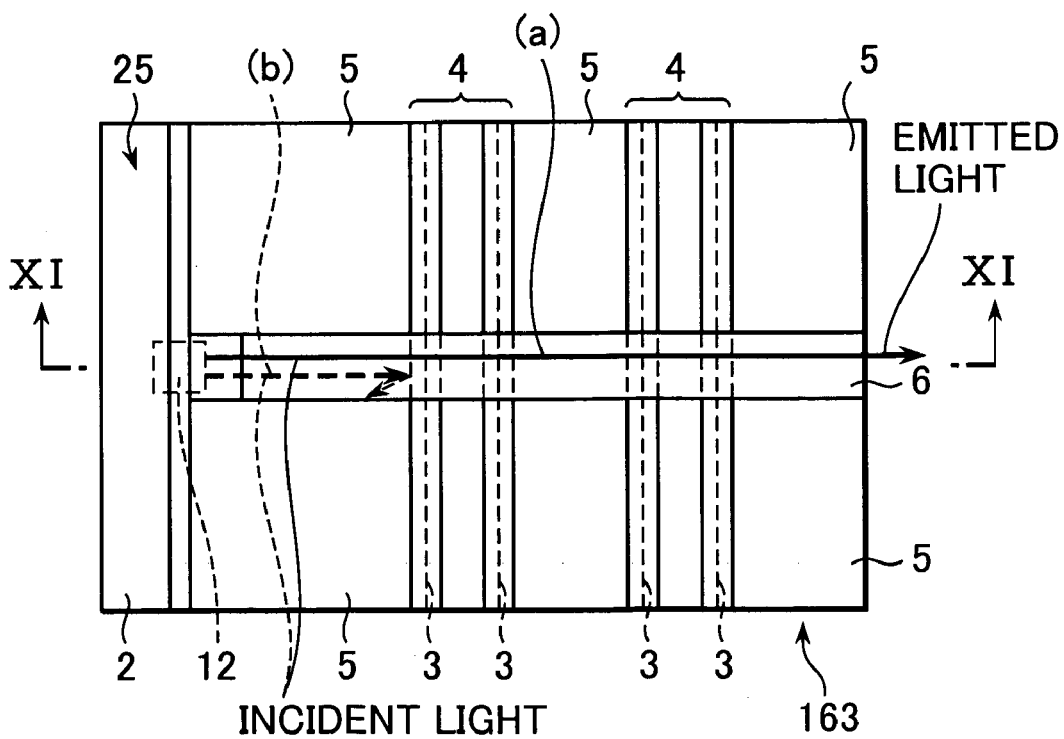
FIG. 11B is a plan view of an optical waveguide according to a second embodiment of the present invention.

As shown in FIGS. 11A–11B and FIGS. 12A–12C, the optical waveguide 163 is configured so that the end portion of an optical waveguide having the same structure with the optical waveguide 160 is removed at an angle of inclination of 45° to thereby form a mirror-finished inclined surface 25, so that the substrate 37 is composed of a material having a large light transmissivity, and so that the LED 12 is disposed on the lower side of the substrate 37 right under the inclined surface 25. The inclined surface 25 has portions of the cladding layer 2, the cladding layer 5 and the core layer 6 exposed therein. FIG. 11A is a sectional view taken along line XI—XI in FIG. 11B, and FIG. 11B is a plan view both showing the optical waveguide 163 of the second embodiment.

Light emitted from the LED 12 goes through the substrate 37, comes to the inclined surface 25 at an angle of inclination of 45° to be reflected thereon based on the mirror effect, and enters the cladding layer 2, the cladding layer 5 and the core layer 6.

Of components of light emitted from the LED 12, incident light entered the core layer 6 reflects on the interface between the core layer 6 and the air, and on the interface between the core layer 6 and the cladding layer 5, because refractive index of the core layer 6 is larger than those of the air and of the cladding layer 5, and propagates through the core layer 6, and emits as an emitted light from the emission surface of the core layer.

On the other hand, light components from the LED 12 entered the cladding layer 2 and the cladding layer 5 collide with the metal layer 4 embedded in the cladding layer 2 and the cladding layer 5, and are absorbed therein or reflected thereon, so that they will never propagate towards the light emission side of the cladding layer 2 and the cladding layer 5 beyond the metal layers 4.

According to the present embodiment, it is also allowable to dispose the LED 12 on the side having a larger area of the incidence surface of the optical waveguide 163, to thereby allow an efficient introduction of emitted light into the core layer 6, and this is consequently successful in raising the degree of freedom in the arrangement of the light sources such as LEDs 12.

Each of the cladding layer 2, the cladding layer 5 and the core layer 6 is inclined in the end surface and is consequently widen in the area thereof from their previous vertical surface, so that each layer can receive a larger energy of light from the light source, and so that it is made possible to increase the energy of light to be propagated through the core layer 6, and to prevent propagation of the light which enters the cladding layer 2 and the cladding layer 5.

Figure 12A:
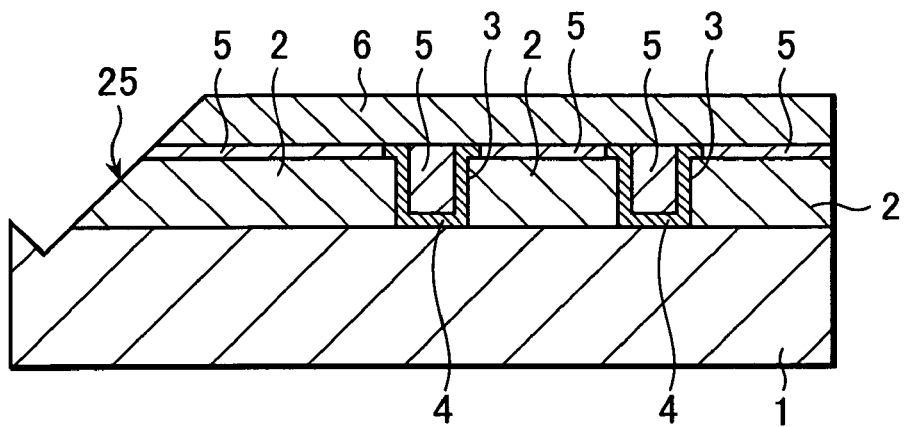
FIG. 12 is a sectional view sequentially explaining fabrication steps of the same optical waveguide according to the same.
Figure 12B:
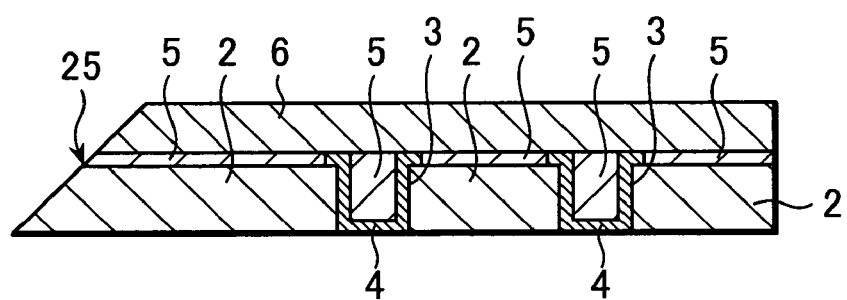
Figure 12C:
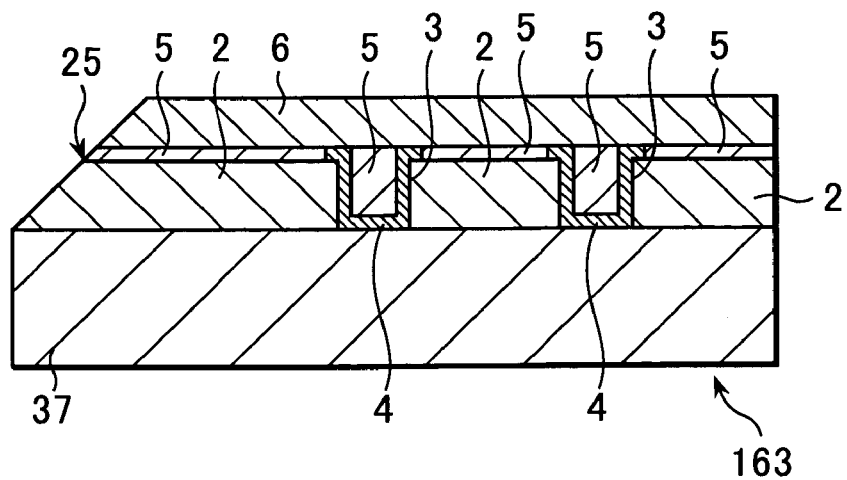

Next paragraphs will describe process steps of fabrication of the optical waveguide 163 referring to FIG. 12A to FIG. 12C.

First, as shown in FIG. 12A, an optical waveguide having the same structure with the above-descried optical waveguide 160 of the first embodiment is fabricated. Next, the core layer 6, the cladding layer 5, the cladding layer 2 and the substrate 1 of the optical waveguide is sequentially cut from the top using a dicer, to thereby form the mirror-finished inclined surface 25 having an angle of inclination of 45°.

Next, as shown in FIG. 12B, the substrate 1 is separated from the optical waveguide having the inclined surface 25 formed thereon.

Next, as shown in FIG. 12C, another substrate 37 having light transmissivity is provided to the position where the substrate 1 was previously provided, to thereby complete the optical waveguide 163 of the present embodiment.

The cutting with a dicer herein may be carried out at any other angle if necessary, rather than the mirror finishing at 45°.

Any other operations and effects obtainable in the present embodiment are the same as those described in the foregoing first embodiment.

<Third Embodiment>

The present embodiment is similar to the above-described first embodiment, except that an optical waveguide of the present embodiment is configured as a trapezoidal optical waveguide 164 in which the width-wise geometry of the core layer 6 is narrowed from the incidence surface side towards the emission surface side straightly along the direction of propagation of light, and has straight inclined surfaces 56.

As for the present embodiment, states of introduction of light into the core layer 164 and propagation of light therethrough will be described, referring to FIG. 14. It is to be assumed now that the width of the core layer 6 on the incidence surface side is widened so as to reach both side faces of the optical waveguide 164.

Figure 14A:
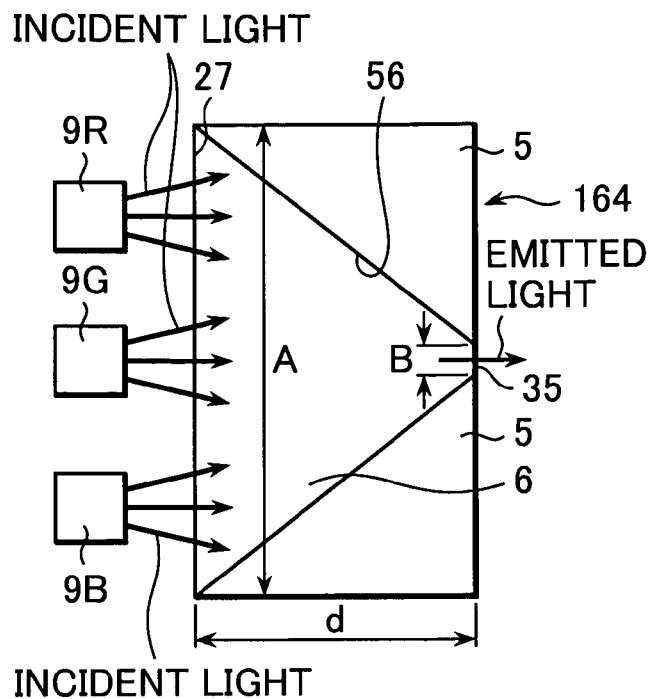
FIG. 14A is a plan view of another optical waveguide according to the same and FIG. 14B shows a characteristic graph thereof.

FIG. 14A shows a state in which the beams of light from the individual LEDs 9R, 9G, 9B are allowed to enter the core layer 6 in the optical waveguide 164 at the same time through the incidence surface 27 and are allowed to emit from the emission surface 35. The width of the incidence surface 27 herein is assumed as A (μm), the width of the emission surface 35 as B (μm), and the distance from the incidence surface 27 to the emission surface 35 as d (mm). The width of the core layer 6 is straightly narrowed from the incidence surface 27 towards the emission surface 35 by the straight inclined surfaces 56. The straight inclined surfaces 56 can enhance total reflection on the interface between the core layer 6 and the cladding layer 5, and allows an efficient wave-guiding through the core layer 6.

Figure 14B:
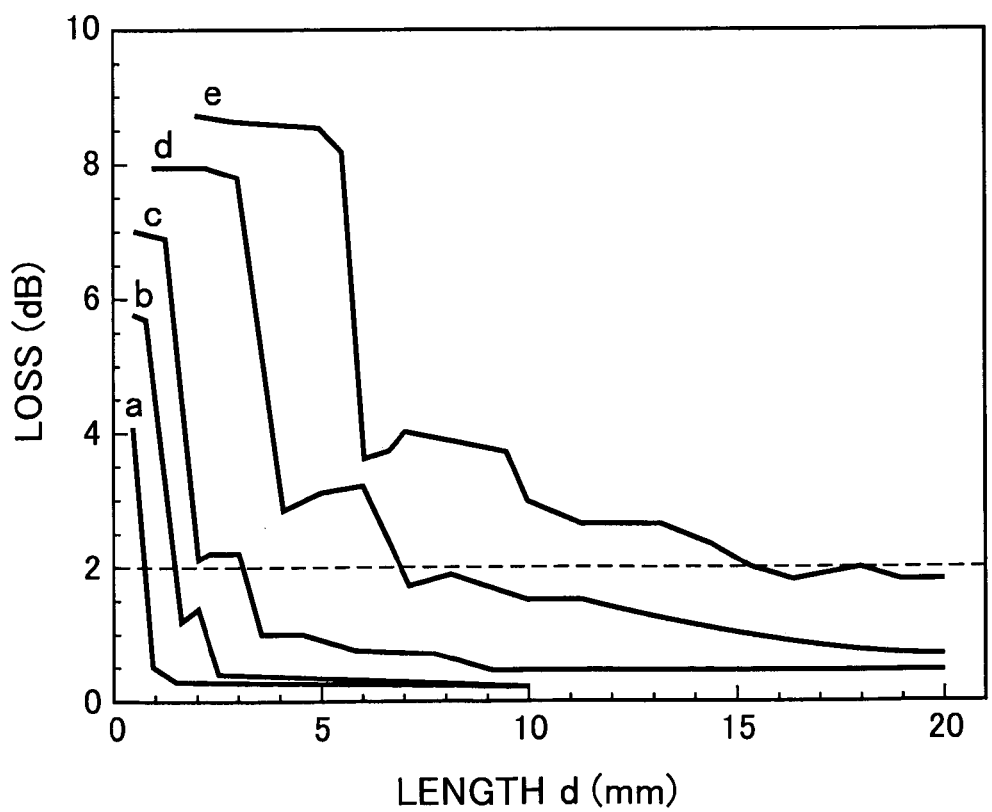

FIG. 14B shows correlative property of the distance d (mm) from the incidence surface 27 to the emission surface 35 and optical loss (dB). Conditions are set as follows:

TABLE 1

| | Incidence Surface Width A (μm) | Emission Surface Width B (μm) |
|---|---|---|
| a | 200 | 50 |
| b | 300 | 50 |
| c | 400 | 50 |
| d | 500 | 50 |
| e | 600 | 50 |

It is found from the drawing that, under setting of an allowable optical loss of optical waveguide 164 to not higher than 2 dB as indicated by the broken line in the graph, while fixing the width B of the emission surface 35 to 50 μm, condition "a" under which the width A of the incidence surface is set to 200 μm needs a lower limit of the distance d from the incidence surface 27 to the emission surface 35 of approximately 0.7 mm in order to suppress the optical loss to 2 dB or below, and condition "b" under which the width A of the incidence surface 27 is set to 300 μm needs a lower limit of the distance d from the incidence surface 27 to the emission surface 35 of approximately 1.5 mm in order to suppress the optical loss to 2 dB or below. Similarly to the above, widening of the width A of the incidence surface 27 as indicated by conditions "c", "d" and "e" in this order tends to elevate the lower limits of the distance d from the incidence surface 27 to the emission surface 35 of ca. 3.0 mm, ca. 6.8 mm and ca. 15.0 mm, respectively, in order to suppress the optical loss to 2 dB or below.

It is known from the results that, under a fixed width B of the emission surface 35, narrowing of the width A of the incidence surface 27 so as to reduce the angle of inclination of the straight inclined surfaces 56 makes it possible to suppress the optical loss to as low as 2 dB or below, and to make the distance d from the incidence surface 27 to the emission surface 35 relatively short. This indicates that it is preferable to specify the width A in order to certainly improve the wave-guiding efficiency by the straight inclined surfaces 56.

Figure 15A:
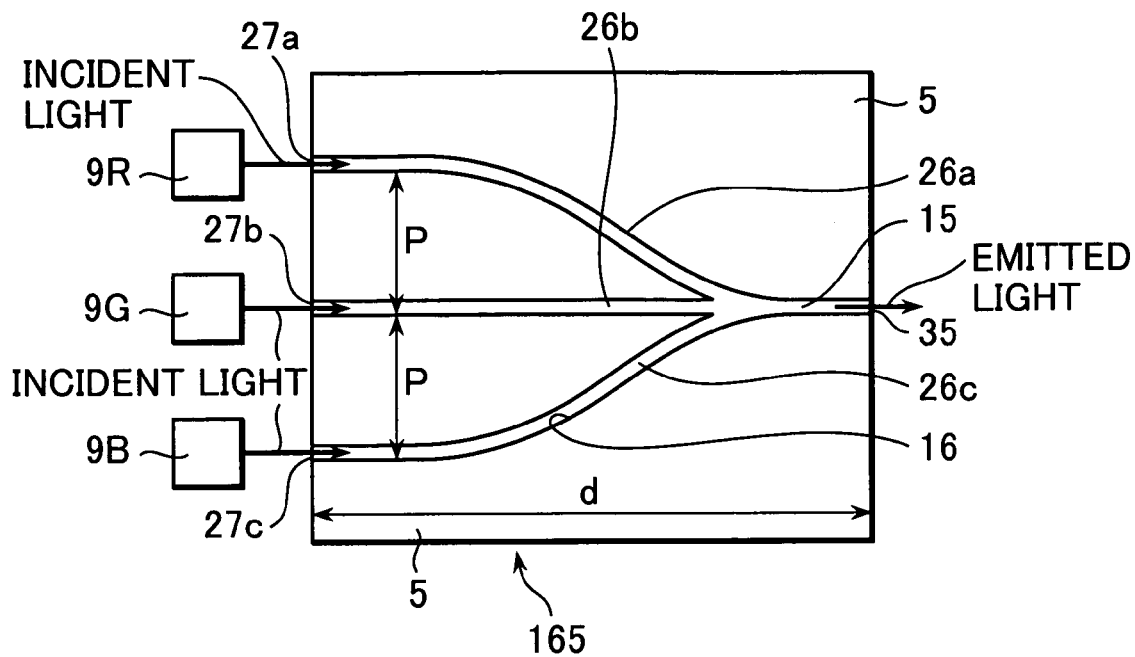
FIG. 15 is a plan view of still another optical waveguide according to the same and FIG. 15B shows a characteristic graph thereof.
Figure 15B:
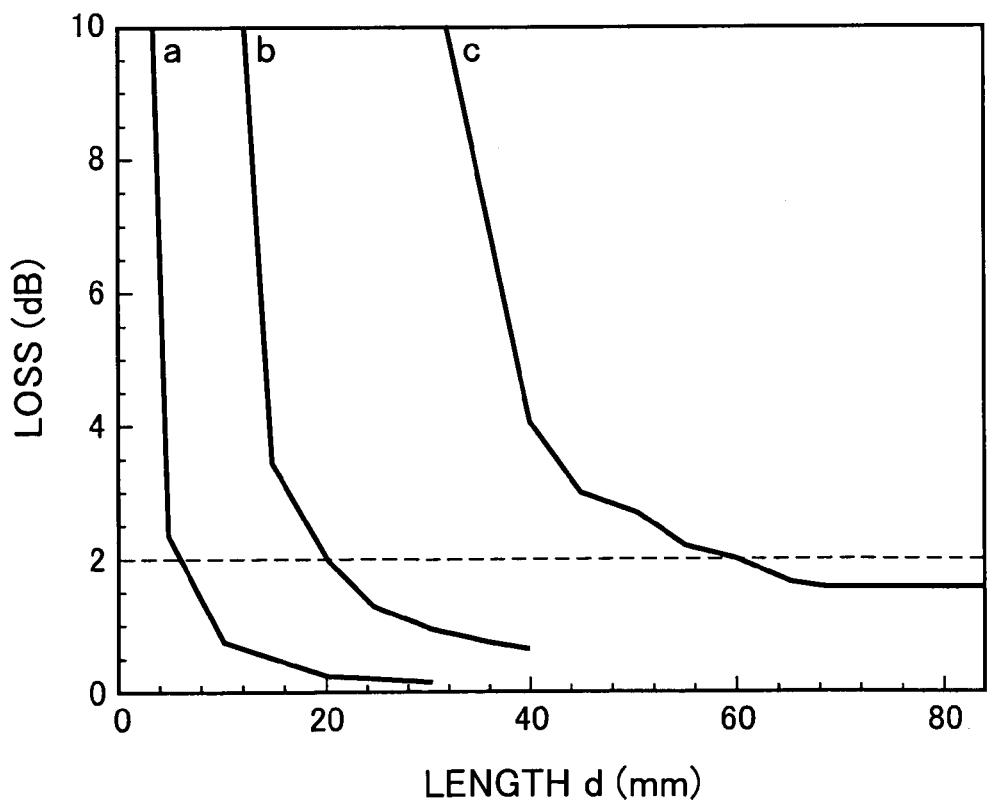

In contrast to this, an optical waveguide 165 shown in FIG. 15A is configured so that the core layer is divided into three core portions 26a, 26b and 26c respectively composed of curved inclined surfaces 16, three colors of light sources 9R, 9G and 9B are disposed on the side of the incidence surfaces 27a, 27b and 27c, respectively, the core portions 26a and 26c are made confluent with the core portion 26b on this side of the emission surface 35, to thereby guide the light through a common core portion 15 towards the emission surface 135 and allow the light to emit therefrom. Assuming now that the width of the emission surface 35 is fixed to 50 μm, pitch of the adjacent core portions as P (μm), and the distance from the incidence surfaces 27a, 27b and 27c to the emission surface 35 as d (mm), correlative property of the distance d (mm) from the incidence surfaces 27a, 27b and 27c to the emission surface and optical loss (dB) is expressed as shown in FIG. 15B. Conditions are set as follows:

TABLE 2

|   | Core Layer Pitch P (μm) |
|---|---|
| a | 200 |
| b | 400 |
| c | 600 |

It is found from the drawing that, under setting of an allowable optical loss of optical waveguide 165 to not higher than 2 dB as indicated by the broken line in the graph, while fixing the width B of the emission surface 35 to 50 μm, condition "a" under which the pitch P of the adjacent core portions is set to 200 μm needs a distance d from the incidence surfaces 27a, 27b and 27c to the emission surface 35 of approximately 6 mm or more. Similarly, the pitches P of the adjacent core portions set to 400 μm and 600 μm need the distance d from the incidence surfaces 27a, 27b and 27c to the emission surface 35 of approximately 20 mm or more, and approximately 60 mm or more, respectively.

It is known from the results that, even if the pitch P of the adjacent core portions is narrowed so as to moderate the angle of inclination of the curved inclined surfaces 16 of the core portions 26a and 26c, the distance d must be increased to as large as approximately 6 mm for the purpose of suppressing the optical loss to 2 dB or below. This is because the angles of inclination of the curved inclined surfaces 16 of the core portions 26a and 26c are still large, and this is unsuccessful in fully suppressing light leakage from these portions of the core layer 6 into the cladding layer 5, and also because the light leakage will never be decreased unless the curved inclined surfaces 16 are moderated by increasing the aforementioned distance d.

In contrast to this, the optical waveguide 164 shown in FIG. 14 is configured so that the core layer 6 has straight inclined surfaces 56, so that only a simple control of the angle of inclination thereof (that is, the width A of the incidence surface 27) will be successful in increasing total reflection on the interface between core layer 6 and the cladding layer 5, in enhancing the wave-guiding efficiency through the core layer 6, and in shortening the distance d of the optical waveguide. The optical waveguide 165 shown in FIG. 15, having a small incidence surface, has only a small degree of freedom in the arrangement of the individual light sources corresponding to the incidence surfaces, and also suffers from loss in incident energy, whereas the optical waveguide 164 shown in FIG. 14, having the incidence surface 27 formed over the width A commonly for the individual light sources, is successful in facilitating the arrangement of the light sources, and in increasing the incident light energy.

In the structure of the optical waveguide 163 as previously shown in FIG. 11, control of intensity of signal lights of the individual colors or color balance allows the light, emitted from the emission surface 35 of the optical waveguide 163, to be projected as a signal light, having a desired spot size and a sufficient energy, for example on a screen in the succeeding stage, and this makes it possible to obtain a display capable of reproducing full-color images.

Figure 16:
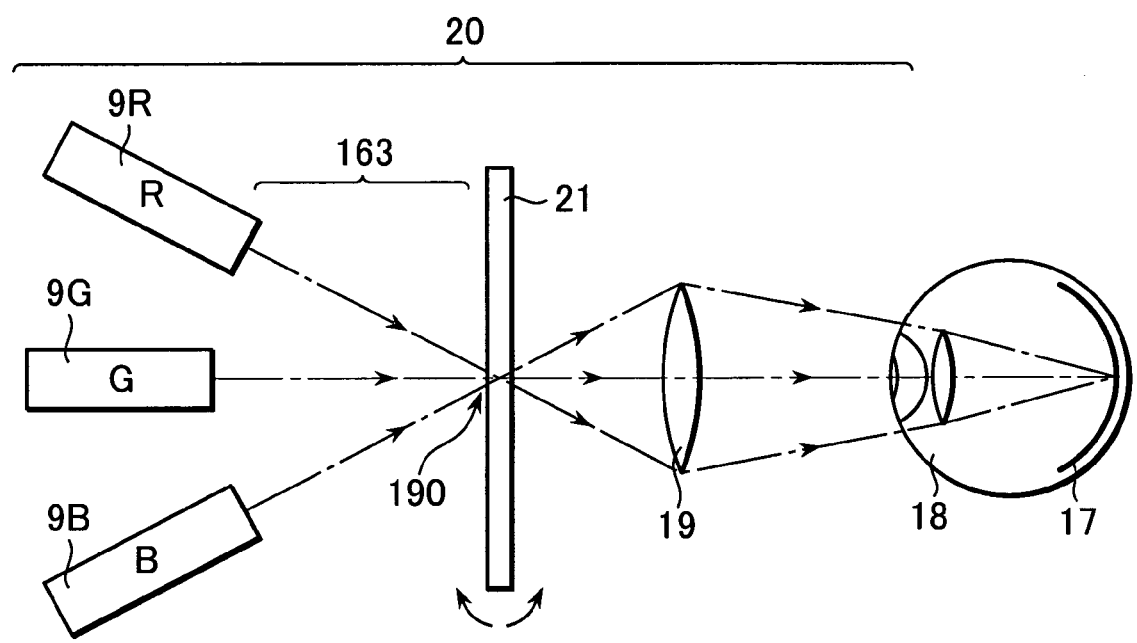
FIG. 16 is a schematic drawing of a head mounted display according to an embodiment of the present invention.

FIG. 16 shows an exemplary application of this sort of display to a head-mounted display (HMD) 20, configured so that a large number of the optical waveguides 163 shown in FIG. 11, each of which being equivalent to a unit pixel herein, are arranged in line in a direction perpendicular to the sheet of the drawing, beams of light of the individual colors from the red light source 9R, green light source 9G and blue light source 9B are multiplexed for the individual unit pixel, and emitted light 190 from the optical waveguide 163 having a shrunk beam size is then allowed to pass through a scanned image plane 21, so as to be focused (so as to create a beam spot), with the aid of an optical lens 19 or the like, on a reticulum 17 of a human eyeball 18 which is in an optically conjugate relation with the scanned image plane 21.

The imaging point is created on the reticulum 17 by a single line, wherein scanning by the scanned image plane 21 in the direction perpendicular to the line on the reticulum 17 makes it possible for a user to personally feel a realistic movie image.

The head-mounted display 20 can provide a compact movie device as being incorporated into a projector, camera, computer, game machine and so forth in a manner such as wearing sunglasses.

Figure 17:
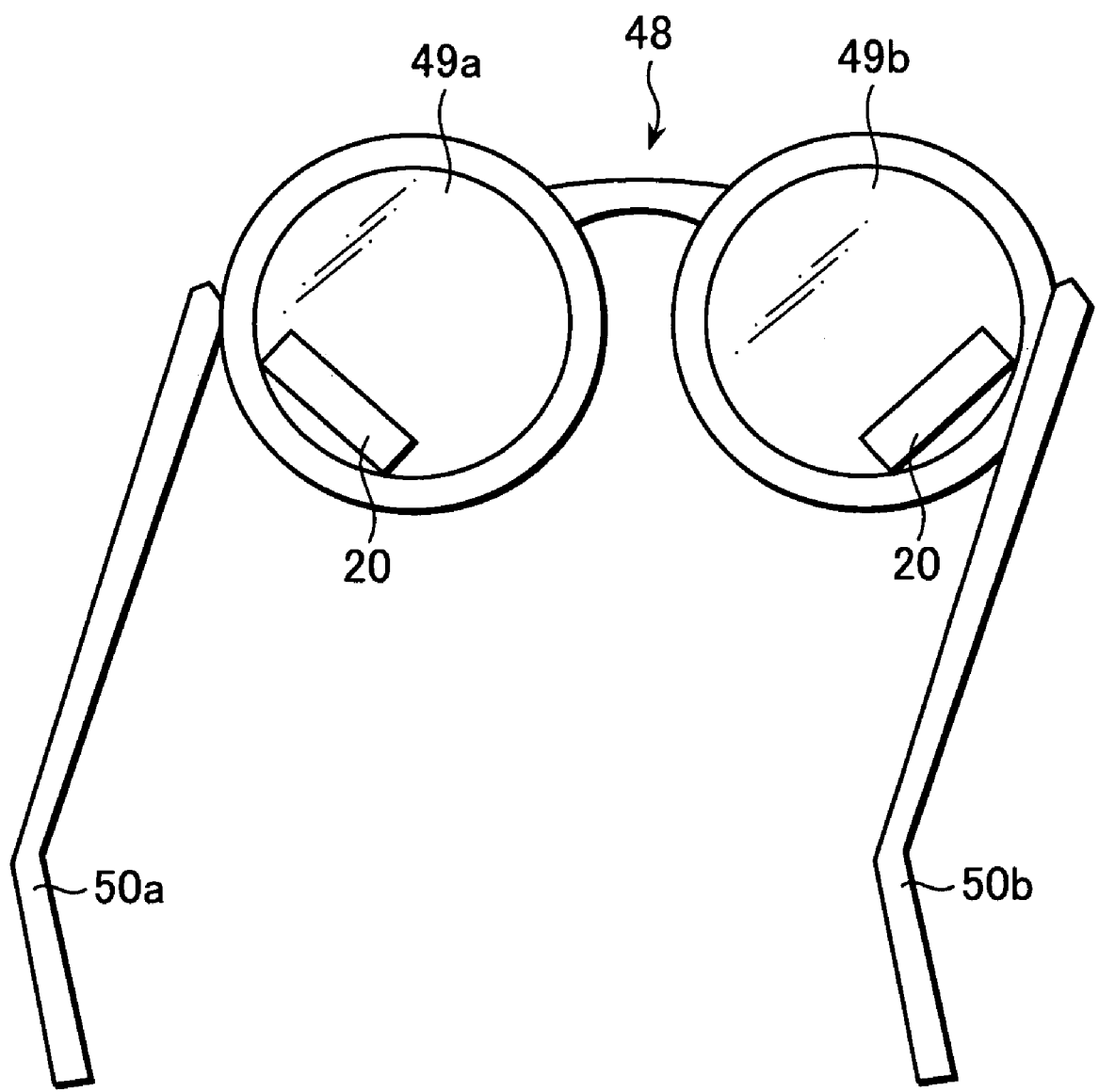
FIG. 17 is a perspective view of an exemplary application of the head mounted display according to the same.

Next paragraphs will describe a sunglasses-formed glasses 48 for display observation using the aforementioned head-mounted display 20, referring to FIG. 17.

The glasses 48 comprises a left bow 50a, a right bow 50b, a left lens portion 49a and a right lens portion 49b, and further comprises the head-mounted display 20 mounted on the left lower portion of the left lens portion 49a, and still further comprises the head-mounted display 20 mounted on the right lower portion of the right lens portion 49b.

This glasses 48 does not necessarily have light transmissivity, because it is configured so that the user can observe the incident light from the individual head-mounted displays 20 provided to the individual lens portions as an image by its left and right eyes, in which the left lens portion 49a and the right lens portion 49b given with light transmissivity makes it possible to observe not only images produced by the light incident through the individual head-mounted displays 20, but also images produced by the frontal light incident through the left lens portion 49a and right lens portion 49b.

It is also possible to observe the incident light from the individual head-mounted displays 20 as a clearer image, by providing a hood around each of the left lens portion 49a and the right lens portion 49b so as to intercept the external light.

Figure 18:
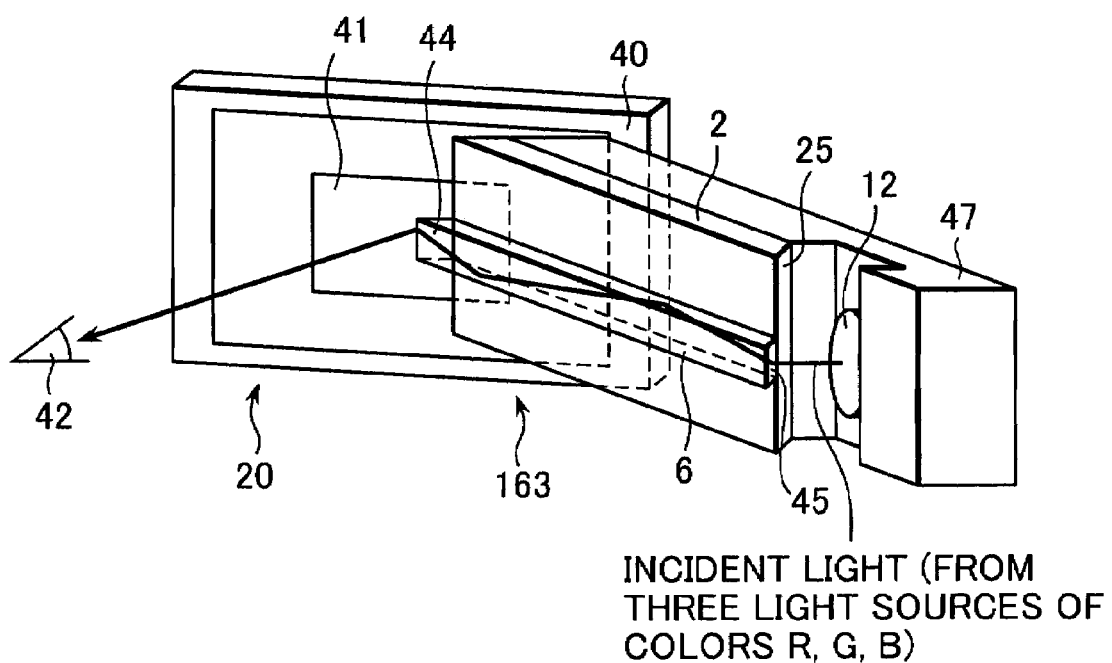
FIG. 18 is a perspective view of the head mounted display according to the same.

The head-mounted display 20 is configured, as shown in FIG. 18, so that beams of light of the individual colors from the LED 12, being composed of the red light source 9R, the green light source 9G and the blue light source 9B and being disposed in a recess of a substrate 47, are allowed to enter the core layer 6, having the mirror-finished 45° inclined surface 25, of the optical waveguide 163, allowed to propagate therethrough, and so that the emitted light from an emission surface 44 then collides with a light reflecting surface 41 of a light reflecting plate 40 for scanning and is reflected thereon, so as to be focused (so as to create a beam spot), with the aid of optical lenses or the like, on a reticulum of a human eye 42 which is in an optically conjugate relation with the light reflecting plate 40.

It is to be noted that illustration of the beams of light from the LED 12 which is composed of the red light source 9R, the green light source 9G and the blue light source 9B is simplified herein as being multiplexed before entering into the core layer 6. It is also to be noted that the aforementioned optical waveguide 163 is configured so that the light emitted from the LED enters the core layer 6 after transmitting the substrate 37, the present embodiment adopts a structure allowing direct entrance of light into the core layer 6 without transmission through the substrate and so forth.

Figure 20A:
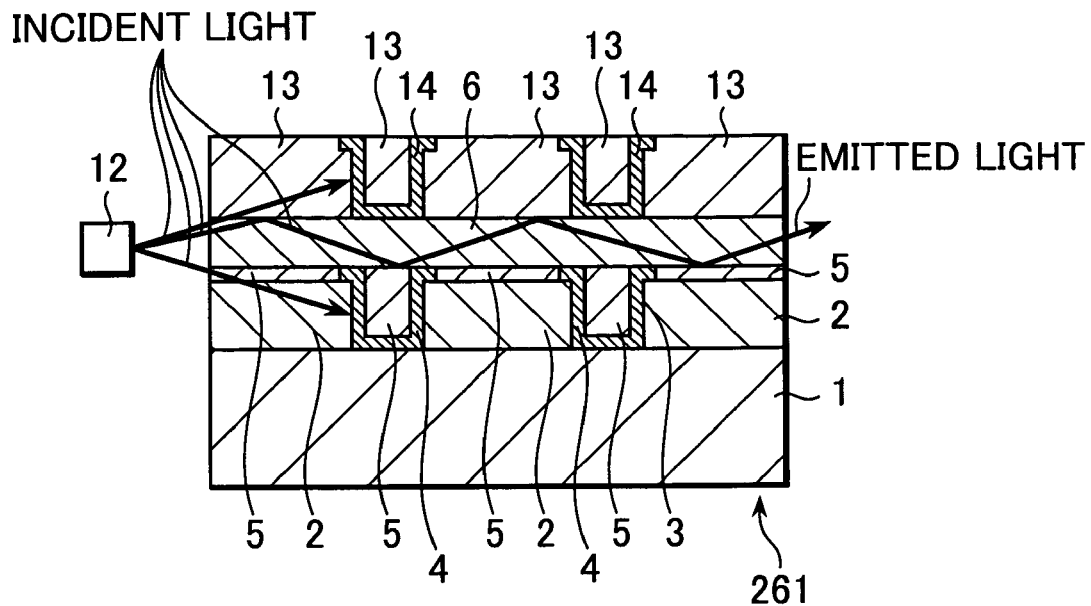
FIG. 20A and FIG. 20B are sectional views of optical waveguides of still other examples according to the same.
Figure 20B:
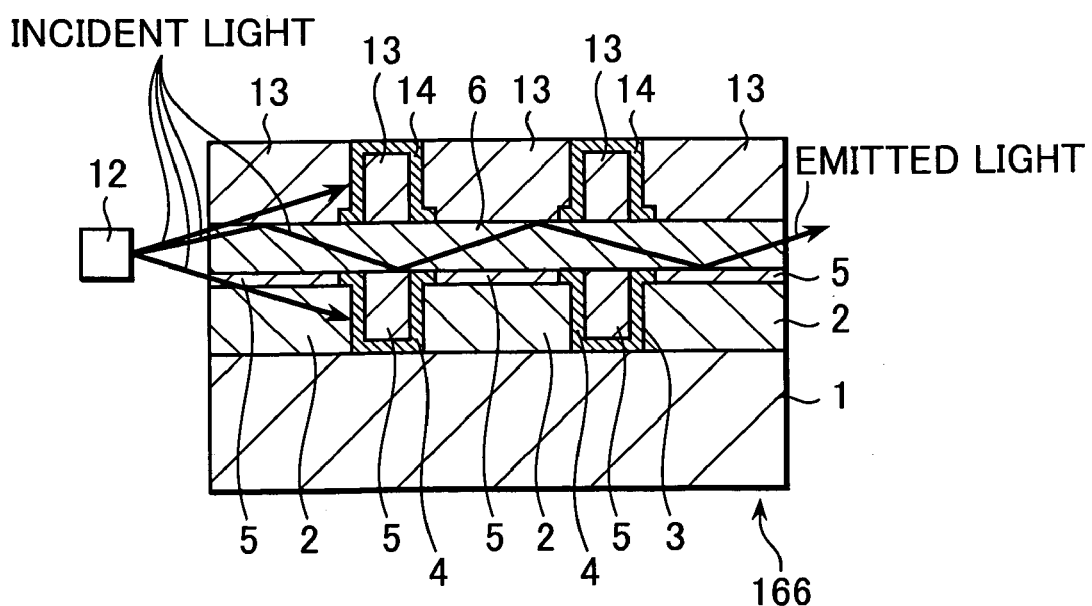
Figure 21:
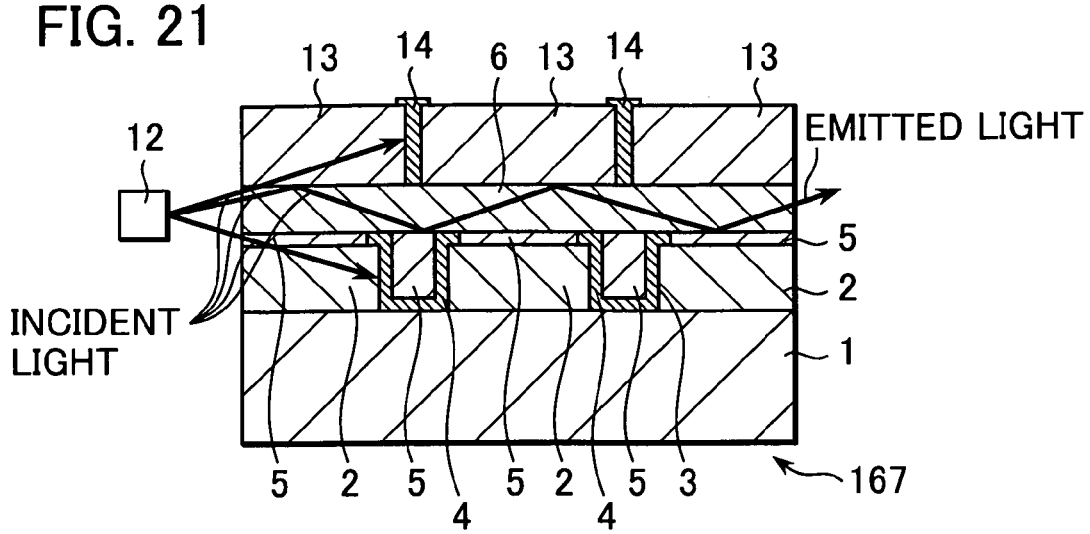
FIG. 21 shows a sectional view of an optical waveguide according to still another example.

Next paragraphs will describe several examples of the optical waveguide 160 having the core layer 6 covered with a cladding layer 13, referring to sectional views shown in FIG. 19 to FIG. 21. It is to be noted herein that the individual embodiments described below can yield operations and effects same as those obtainable from the aforementioned first embodiment.

Figure 19A:
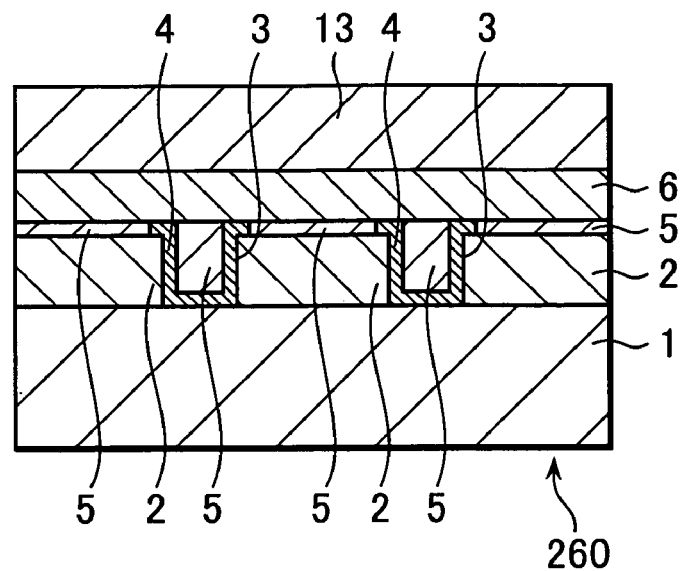
FIG. 19A shows a sectional view taken along a line XIX—XIX in FIG. 19B
Figure 19B:
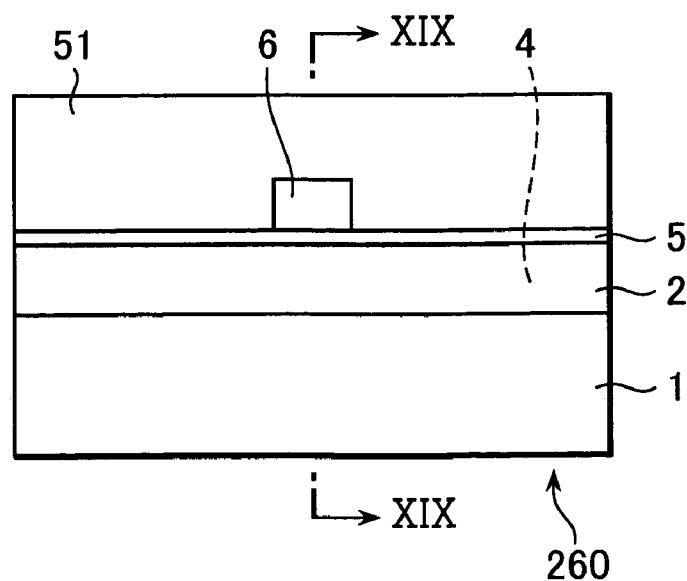
FIG. 19B shows a rear view of an optical waveguide of another example according to the same.

First, as shown in FIG. 19A and FIG. 19B, the top surface and side faces of the core layer 6 of the above-described optical waveguide 160 are covered with a clad material so as to form the cladding layer 13, to thereby form an optical waveguide 260. FIG. 19A is a sectional view taken along a line XIX—XIX in FIG. 19B and FIG. 19B is a rear view, both showing the optical waveguide 260.

This makes it easier to protect the core layer 6 from external impact or the like, to thereby keep the geometry thereof.

In the next embodiment shown in FIG. 20A as a sectional view of an optical waveguide 261, the upper surface and side faces of the core layer 6 exposed to the air are covered with a clad material to thereby form the cladding layer 13, and metal layers 14 having the same geometry with the metal layers 4 formed in the cladding layer 2 and 5 are formed at two similar sites in the cladding layer 13. Each of the metal layers 14 has a nearly U shape opened upward, and is formed in a direction perpendicular to the direction of propagation of light, in order to prevent the propagation of light coming from the LED 12 into the cladding layer 13.

This embodiment is successful in making it easier to protect the core layer 6 from external impact or the like, to thereby keep the geometry thereof, and in preventing propagation of light coming from the LED 12 into the cladding layer 13.

In the next embodiment shown in FIG. 20B as a sectional view of the optical waveguide 166, the upper surface and side faces of the core layer 6 exposed to the air are covered with a clad material to thereby form the cladding layer 13, and metal layers 14 having the same geometry with the metal layers 4 formed in the cladding layer 2 and 5 are formed at two similar sites in the cladding layer 13. Each of the metal layers 14 has a nearly U shape opened downward, and is formed in the direction perpendicular to the direction of propagation of light, in order to prevent the propagation of light coming from the LED 12 into the cladding layer 13.

This is successful in making it easier to protect the core layer 6 from external impact or the like, to thereby keep the geometry thereof, and in preventing propagation of light coming from the LED 12 into the cladding layer 13, and in further stabilizing the refractive index at the interface between the core layer 6 and the cladding layer 13 by narrowing the contact area of the metal layers 14 at the interface, to thereby ensure a more efficient propagation of light through the core layer 6.

In the next embodiment shown in FIG. 21 as a sectional view of the optical waveguide 167, the upper surface and side faces of the core layer 6 exposed to the air are covered with a clad material to thereby form the cladding layer 13, and metal layers 14 having a plate-like geometry are formed in the cladding layer 13 at two sites equivalent to where the metal layers 4 are formed in the cladding layer 2 and 5. The metal layers 14 are formed in the direction perpendicular to the direction of propagation of light, in order to prevent the propagation of light coming from the LED 12 into the cladding layer 13.

This embodiment is successful in making it easier to protect the core layer 6 from external impact or the like, to thereby keep the geometry thereof, and in preventing propagation of light coming from the LED 12 into the cladding layer 13. This is also successful in stabilizing the refractive index at the interface between the core layer 6 and the cladding layer 13, and consequently in ensuring a more efficient propagation of light through the core layer 6, because the contact area of the metal layers 14 at the interface can be narrowed. The plate-formed metal layers 14 can be formed in a relatively easy manner by virtue of their relatively simple geometry.

<Various Modified Examples>

Next paragraphs will describe several modified examples of the optical waveguide 160 referring to plan views shown in FIG. 22 to FIG. 24.

Figure 13:
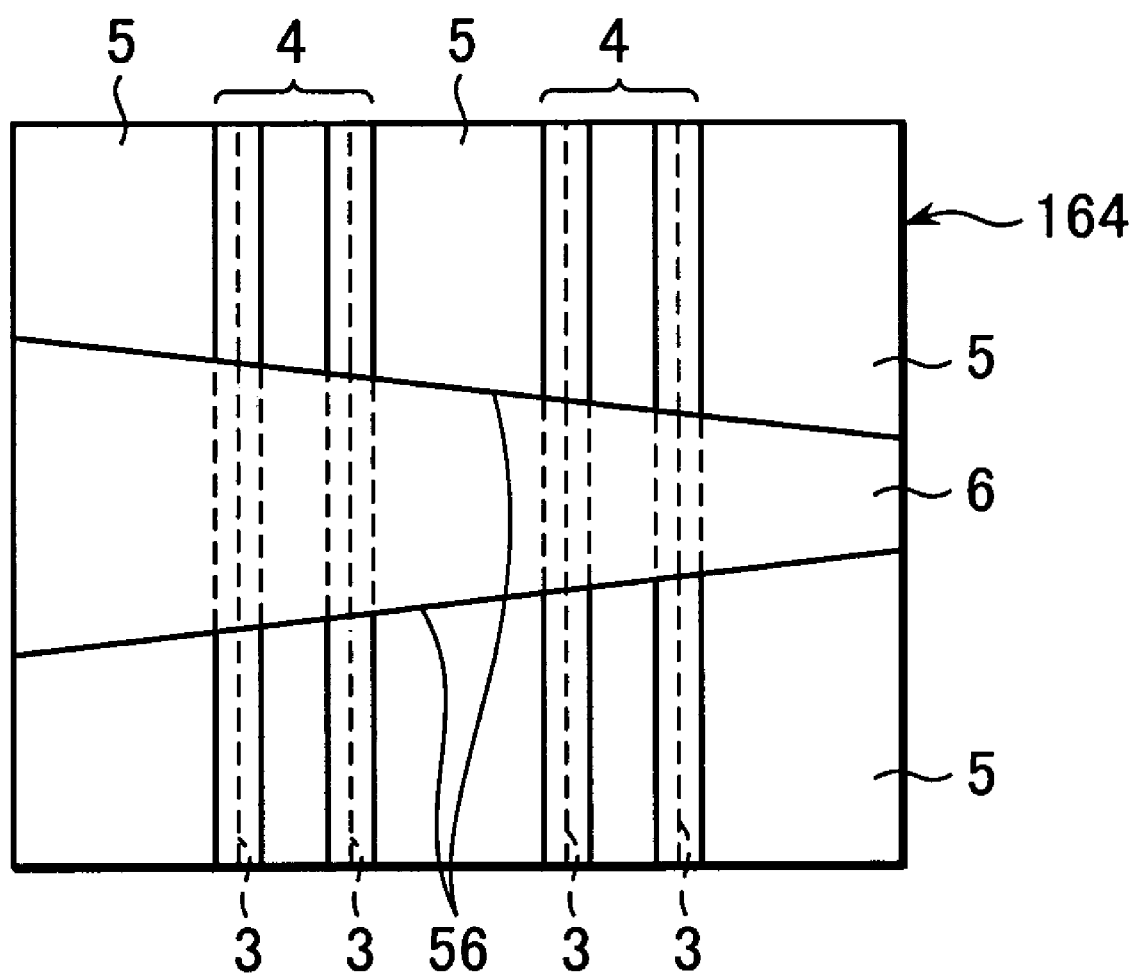
FIG. 13 is a plan view of an optical waveguide according to a third embodiment of the present invention.
Figure 22A:
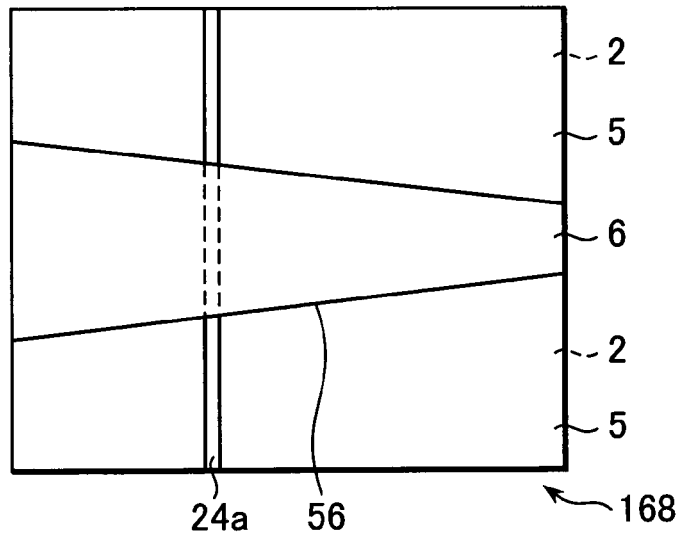
FIG. 22A and FIG. 22B are plan views of optical waveguides of still other examples according to the same.

An optical waveguide 168 shown first in FIG. 22A has a structure similar to that of the optical waveguide 164 shown in FIG. 13, in which the core layer 6 has straight inclined surfaces 56 so as to show a trapezoidal form, by which the width-wise geometry thereof is straightly narrowed from the incidence surface side towards the emission surface side along the direction of propagation of light.

In the cladding layer 5 and the cladding layer 2, there are provided metal layers 24a having the same structure with the metal layers 4, so as to extend over the full length from the left side face to the right side face with respect to the direction of propagation of light, in the direction perpendicular to the direction of propagation of light. It is to be noted herein that illustration of the individual metal layers in the succeeding drawings will be simplified.

In the present embodiment, the beams of light coming through the incidence surfaces of the cladding layer 5 and the cladding layer 2 are prevented from propagating by the metal layer 24a, and are never emitted from the emission surface side of the cladding layer 5 and the cladding layer 2.

Figure 22B:
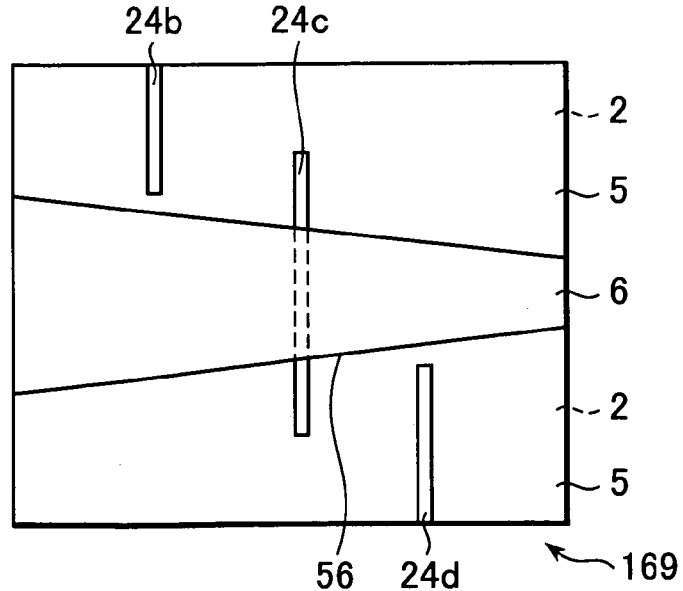

An optical waveguide 169 shown next in FIG. 22B has a structure similar to that of the optical waveguide 164 shown in FIG. 13, in which in the cladding layer 5 and the cladding layer 2, there are provided a metal layer 24b as a part of a first continuous layer extending from the left side faces of the cladding layer 5 and the cladding layer 2 with respect to the direction of propagation of light towards the center portion, in the direction perpendicular to the direction of propagation of light; a metal layer 24c as a second continuous layer extending within a range inside the left side faces and right side faces of the cladding layer 5 and the cladding layer 2 with respect to the direction of propagation of light, in the direction perpendicular to the direction of propagation of light; and a metal layer 24d as a part of a third continuous layer extending from the right side faces of the cladding layer 5 and the cladding layer 2 with respect to the direction of propagation of light towards the center portion, in the direction perpendicular to the direction of propagation of light. The left side faces and right side faces herein are on the opposed edges.

As viewed from the incidence surface side, the metal layer 24b is disposed first, the metal layer 24c is disposed behind the metal layer 24b, and the metal layer 24d is disposed further behind the metal layer 24c. The individuals of the metal layers are configured so as to overlap with each other in the direction of propagation of light.

In the present embodiment, the beams of light coming through the incidence surfaces of the cladding layer 5 and the cladding layer 2 are successively prevented from propagating by the metal layer 24b, the metal layer 24c and the metal layer 24d sequentially disposed so as to overlap with each other, and are never emitted from the emission surface side of the cladding layer 5 and the cladding layer 2.

Figure 23A:
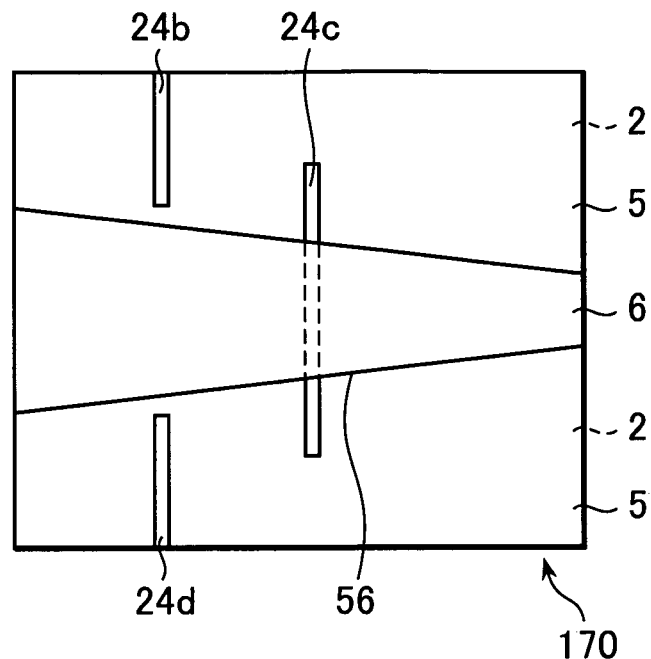
FIG. 23A and FIG. 23B are plan views of optical waveguides of still other examples according to the same.

An optical waveguide 170 shown next in FIG. 23(A) has a structure similar to that of the optical waveguide 164 shown in FIG. 13, in which, in the cladding layer 5 and the cladding layer 2, there are provided the metal layer 24b extending from the left side-faces of the cladding layer 5 and the cladding layer 2 with respect to the direction of propagation of light towards the center portion, in the direction perpendicular to the direction of propagation of light; the metal layer 24d extending from the right side faces of the cladding layer 5 and the cladding layer 2 with respect to the direction of propagation of light towards the center portion, in the direction perpendicular to the direction of propagation of light; and the metal layer 24c extending within a range inside the left side faces and right side faces of the cladding layer 5 and the cladding layer 2 with respect to the direction of propagation of light, in the direction perpendicular to the direction of propagation of light.

As viewed from the incidence surface side, the metal layer 24b and the metal layer 24d are disposed first at the same level of depth, and the metal layer 24c is disposed behind the metal layer 24b and the metal layer 24d. The individuals of the metal layers are configured so as to overlap with each other in the direction of propagation of light.

In the present embodiment, the beams of light coming through the incidence surfaces of the cladding layer 5 and the cladding layer 2 are successively prevented from propagating by the metal layer 24b, the metal layer 24d and the metal layer 24c sequentially disposed so as to overlap with each other, and are never emitted from the emission surface side of the cladding layer 5 and the cladding layer 2.

Figure 23B:
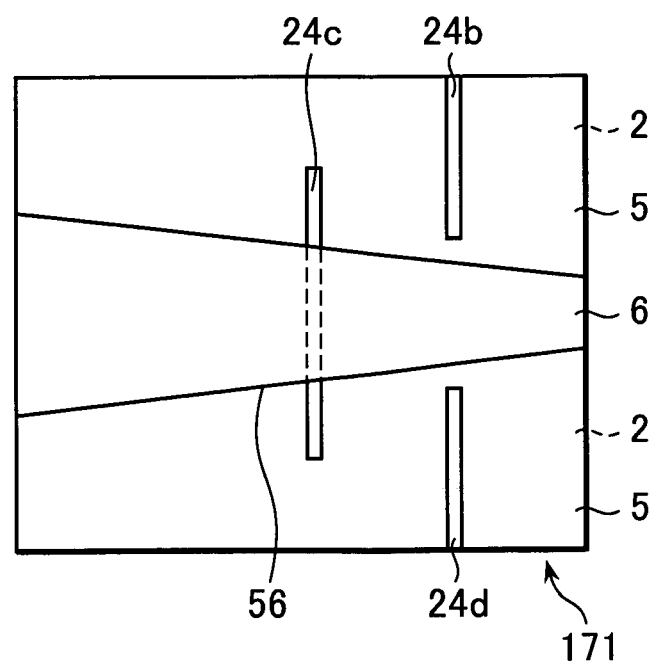

An optical waveguide 171 shown next in FIG. 23B has a structure similar to that of the optical waveguide 164 shown in FIG. 13, in which, in the cladding layer 5 and the cladding layer 2, there are provided the metal layer 24c extending within a range inside the left side faces and right side faces of the cladding layer 5 and the cladding layer 2 with respect to the direction of propagation of light, in the direction perpendicular to the direction of propagation of light; the metal layer 24b extending from the left side faces of the cladding layer 5 and the cladding layer 2 with respect to the direction of propagation of light towards the center portion, in the direction perpendicular to the direction of propagation of light; and the metal layer 24d extending from the right side faces of the cladding layer 5 and the cladding layer 2 with respect to the direction of propagation of light towards the center portion, in the direction perpendicular to the direction of propagation of light.

As viewed from the incidence surface side, the metal layer 24c is disposed first, and the metal layer 24b and the metal layer 24d are disposed at the same level of depth behind the metal layer 24c. The individuals of the metal layers are configured so as to overlap with each other in the direction of propagation of light.

In the present embodiment, the beams of light coming through the incidence surfaces of the cladding layer 5 and the cladding layer 2 are successively prevented from propagating by the metal layer 24c, the metal layer 24b and the metal layer 24d sequentially disposed so as to overlap with each other, and are never emitted from the emission surface side of the cladding layer 5 and the cladding layer 2.

Figure 24A:
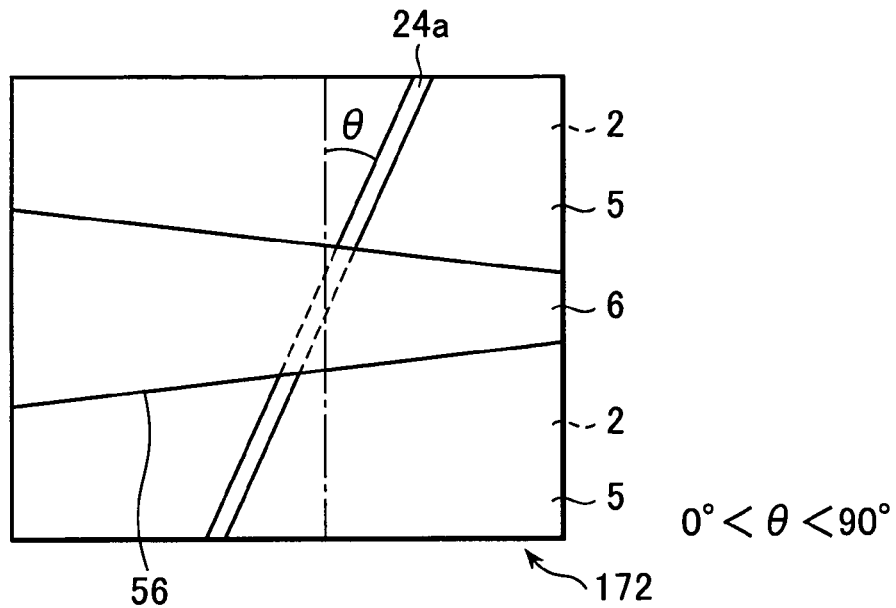
FIG. 24A and FIG. 24B are plan views of optical waveguides of still other examples according to the same.

An optical waveguide 172 shown in FIG. 24A has a structure similar to that of the optical waveguide 164 shown in FIG. 13, in which, in the cladding layer 5 and the cladding layer 2, there is provided the metal layer 24a extending over the full length from the left side face to the right side face with respect to the direction of propagation of light, in the direction oblique to the direction of propagation of light.

The angle of inclination θ preferably falls within a range from 0° (in parallel with the direction of propagation of light) to ±90°, and is typically 30°. In other words, the metal layer 24a preferably extends over the full length between both side faces on the left and right, wherein the limit position resides on the diagonal line connecting the corner portion where the left side faces of the cladding layer 5 and the cladding layer 2 with respect to the direction of propagation of light are abutted with the emission surface or with the incidence surface, and the corner portion where the right side faces of the cladding layer 5 and the cladding layer 2 are abutted with the incidence surface or with the emission surface.

Figure 24B:
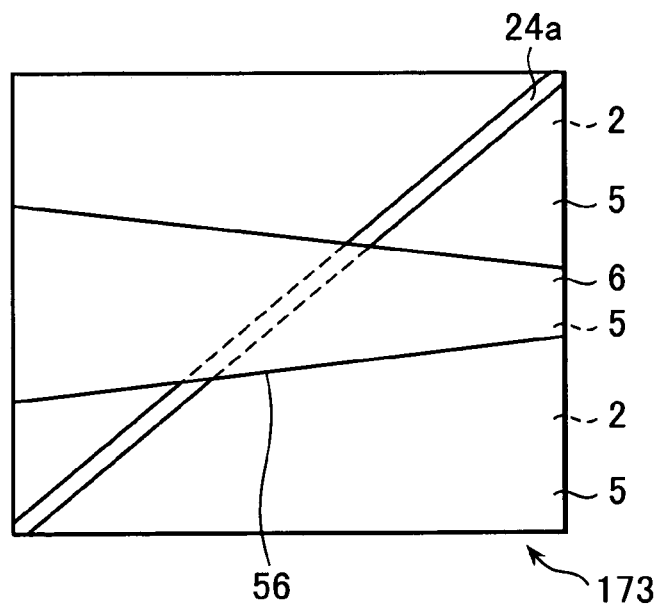

An optical waveguide 173 shown next in FIG. 24B has a structure similar to that of the optical waveguide 164 shown in FIG. 13, in which, in the cladding layer 5 and the cladding layer 2, there is provided the metal layer 24a extending over the diagonal line, which connects the corner portion where the left side faces of the cladding layer 5 and the cladding layer 2 with respect to the direction of propagation of light are abutted with the emission surface, and the corner portion where the right side faces of the cladding layer 5 and the cladding layer 2 are abutted with the incidence surface, in the direction oblique to the direction of propagation of light.

On the contrary, it is also allowable that the metal layer 24a is formed so as to extend over the diagonal line, which connects the corner portion where the left side faces of the cladding layer 5 and the cladding layer 2 with respect to the direction of propagation of light are abutted with the incidence surface, and the corner portion where the right side faces of the cladding layer 5 and the cladding layer 2 are abutted with the emission surface, in the direction oblique to the direction of propagation of light.

In the present embodiment, the beams of light coming through the incidence surfaces of the cladding layer 5 and the cladding layer 2 are successively prevented from propagating by the metal layer 24a which extends from the left side faces towards the right side faces of the cladding layer 5 and the cladding layer 2 with respect to the direction of propagation of light, and are never emitted from the emission surface side of the cladding layer 5 and the cladding layer 2. The metal layer 24a, extending in the direction oblique to the direction of propagation of light, has a larger area for absorption and reflection of the incident light coming through the incidence surfaces of the cladding layer 5 and the cladding layer 2, and this makes it possible to prevent the light propagation in a more efficient manner.

Figure 25A:
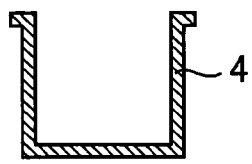
FIG. 25A to FIG. 25C are sectional views of metal layers.
Figure 25B:
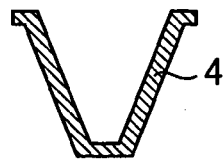
Figure 25C:
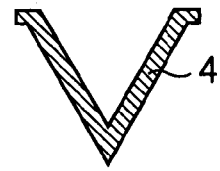

Referring now to FIG. 25, the metal layer 4 or 14 may not only be such as having a nearly U-shaped sectional structure opened upward as shown in FIG. 25A, but also may be such as having an inverted-trapezoidal sectional structure opened upward as shown in FIG. 25B, or still may be such as having a V-formed sectional structure opened upward as shown in FIG. 25C.

FIG. 26 to FIG. 37 show other modified examples of the optical waveguides.

Figure 26A:
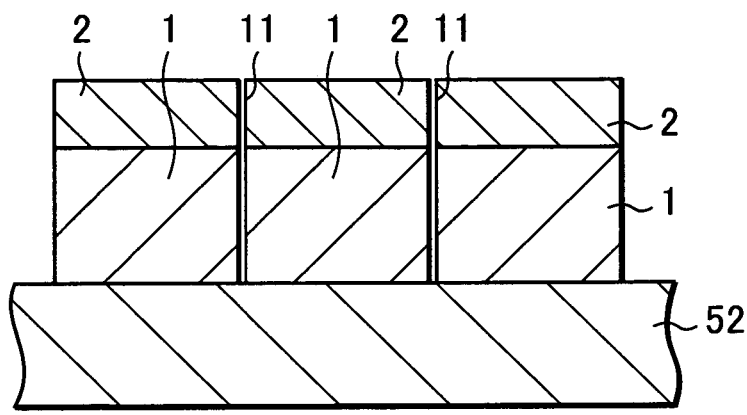
FIG. 26A to FIG. 26C are sectional views sequentially explaining fabrication steps of an optical waveguide of still another example according to the same.

In this example, first as shown in FIG. 26A, the cladding layer 2 of a predetermined thickness is formed on the substrate 1 of a predetermined thickness, and the lower surface of the substrate 1 is then fixed on a supporting member 52. The groove portions 11 are then formed at two predetermined sites so as to penetrate the cladding layer 2 and substrate 1, in the direction perpendicular to the direction of propagation of light.

Figure 26B:
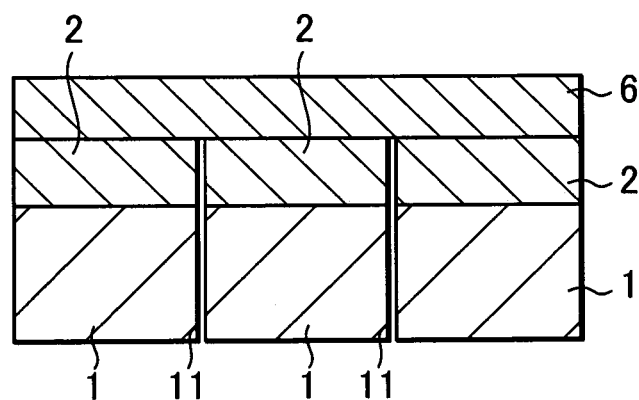

Next, as shown in FIG. 26B, on the cladding layer 2 divided by the groove portions 11, the core layer 6 of predetermined thickness and width is formed so as to connectively support the cladding layers 2. The supporting member 52 is then separated from the lower surface of thus-divided substrate 1.

Figure 26C:
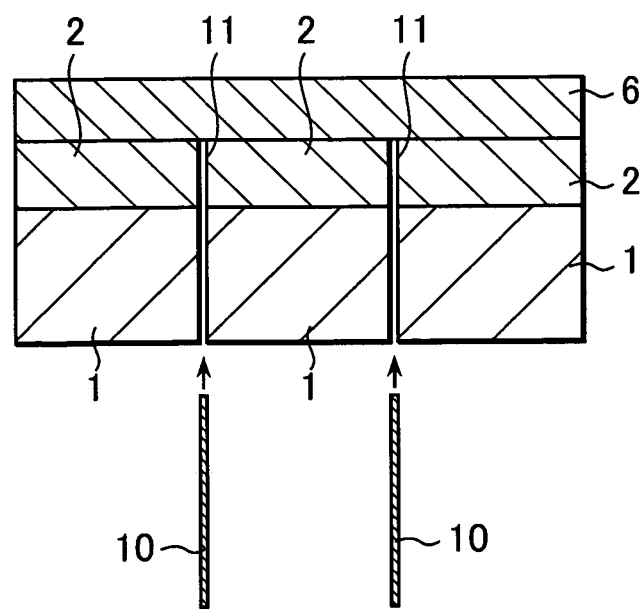
Figure 27:
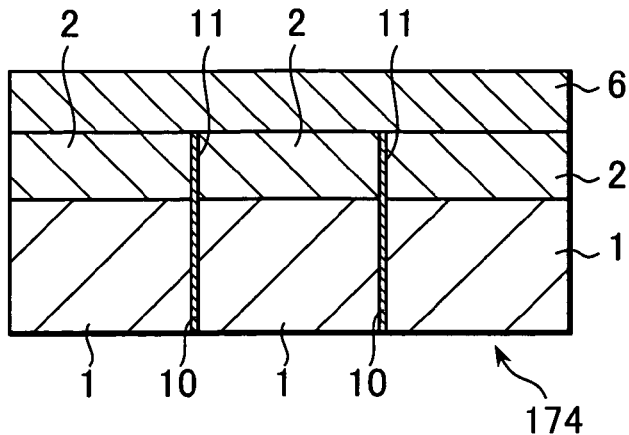
FIG. 27 shows a sectional view explaining a fabrication step of an optical waveguide of still another example according to the same.

Next, as shown in FIG. 26C, sheet-formed metal plates 10 having the same geometry with the groove portions 11 are inserted into the groove portions 11 from the substrate 1 side, to thereby fabricate an optical waveguide 174 as shown in FIG. 27.

In this example, the light coming through the incidence surface of the cladding layer 2 is successively prevented from propagating by the metal plates 10 which penetrate the substrate 1 and the cladding layer 2 from the left side faces to the right side faces thereof with respect to the direction of propagation of light, and extend in the direction perpendicular to the direction of propagation of light, and is never emitted from the emission surface side of the cladding layer 2. If the optical waveguide 174 is configured so as to allow insertion and removal of the metal plates 10 to or from the groove portions 11, it is made possible to adjust area occupied by the metal plates 10 in the cladding layer 2, to thereby control the light propagation preventive performance in the cladding layer 2.

Figure 28A:
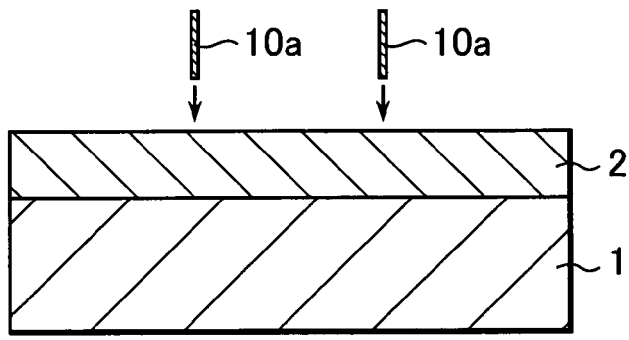
FIG. 28A to FIG. 28C shows sectional views sequentially explaining fabrication steps of an optical waveguide of still another example according to the same.

In an example shown in FIG. 28A, the cladding layer 2 of a predetermined thickness is formed on the substrate 1 of a predetermined thickness, the cladding layer 2 is heated, and two sheet-formed metal plates 10a, which penetrate the cladding layer 2 from the left side face to the right side face thereof with respect to the direction of propagation of light, and extend in the direction perpendicular to the direction of propagation of light, are then press-fit into the cladding layer 2 at predetermined sites, by pressing them from the top.

Figure 28B:
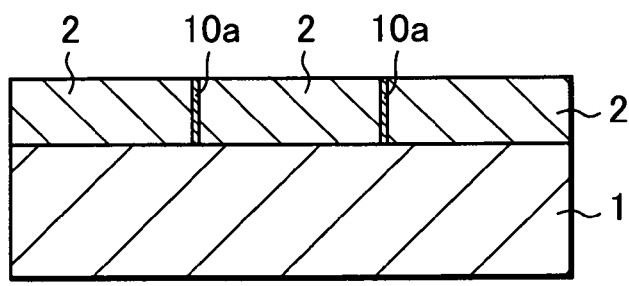
Figure 28C:
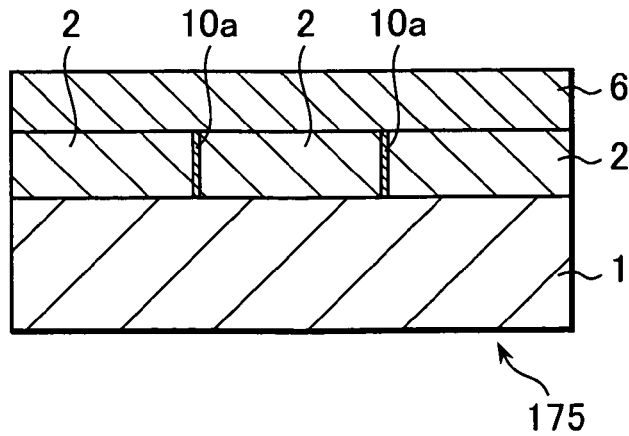

Next, as shown in FIG. 28B, the sheet-formed metal plates 10a embedded in the cladding layer 2 are then fixed under cooling.

Next, as shown in FIG. 28B, the core layer 6 having predetermined thickness and width is formed on the cladding layer 2 having the sheet-formed metal plates 10a embedded therein, to thereby fabricate an optical waveguide 175.

In this example, the light coming through the incidence surface of the cladding layer 2 is successively prevented from propagating by the metal plates 10 which penetrate the cladding layer 2 from the left side face to the right side face thereof with respect to the direction of propagation of light, and extend in the direction perpendicular to the direction of propagation of light, and is never emitted from the emission surface side of the cladding layer 2. This example is also advantageous in omitting the formation process of the groove portions, because the metal plates 10a can be embedded without providing the groove portions in the cladding layer 2.

Figure 29A:
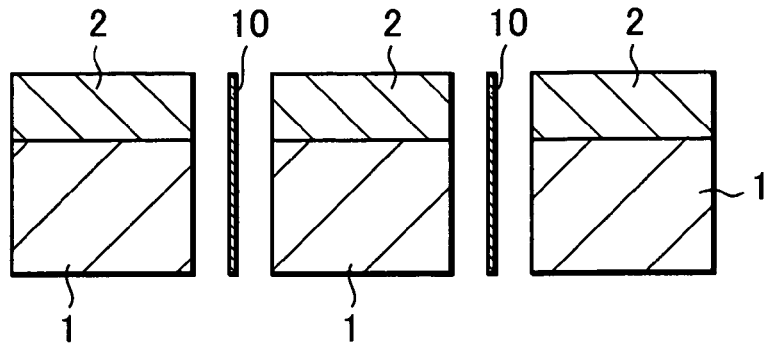
FIG. 29A to FIG. 29C are sectional views sequentially explaining fabrication steps of an optical waveguide of still another example according to the same.

In an example shown in FIG. 29A, the cladding layer 2 of a predetermined thickness is formed on the substrate 1 of a predetermined thickness, a plurality of thus-obtained bonded member of the cladding layer 2 and substrate 1 are arranged as being spaced from each other, and two sheet-formed metal plates 10 respectively having a height equal to the thickness of the bonded member are disposed between every adjacent bonded members, so as to penetrate from the left side face to the right side face with respect to the direction of propagation of light, and so as to extend in the direction perpendicular to the direction of propagation of light.

Figure 29B:
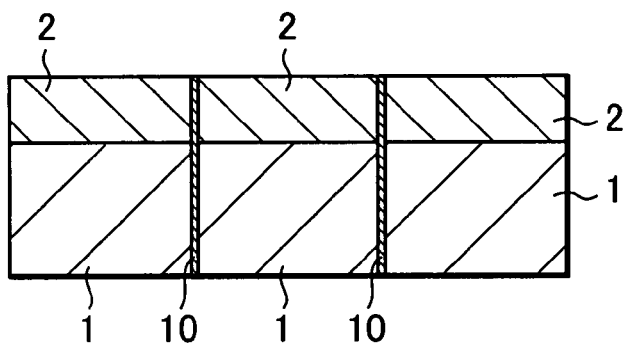

Next, as shown in FIG. 29B, a plurality of bonded members of the cladding layer 2 and the substrate 1 are bonded with the sheet-formed metal plates 10 using an adhesive or the like, to thereby integrate them.

Figure 29C:
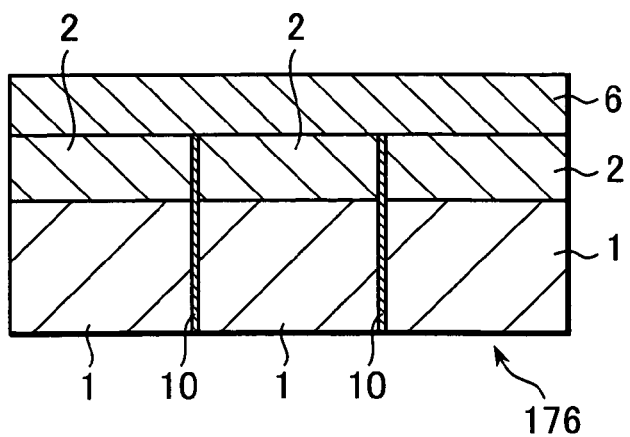

Next, as shown in FIG. 29C, on the cladding layers 2 bonded by the plurality of sheet-formed metal plates 10, the core layer 6 of a predetermined thickness is formed, to thereby fabricate an optical waveguide 176.

In this example, the light coming through the incidence surface of the cladding layer 2 is prevented from propagating by the metal plates 10 which penetrate the cladding layer 2 from the left side face to the right side face thereof with respect to the direction of propagation of light, and extend in the direction perpendicular to the direction of propagation of light, and is never emitted from the emission surface side of the cladding layer 2. Any process step of providing, in the substrate 1 or the cladding layer 2, the groove portions for embedding the metal plates 10 is omissible.

Figure 30A:
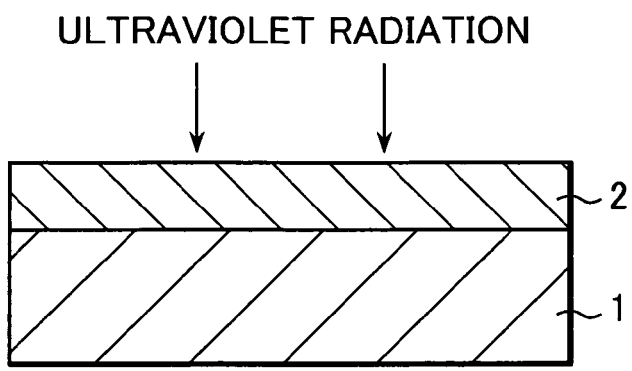
FIG. 30A to FIG. 30C are sectional views sequentially explaining fabrication steps of an optical waveguide of still another example according to the same.

In an example shown in FIG. 30A, the cladding layer 2 of a predetermined thickness is formed on the substrate 1 of a predetermined thickness, and ultraviolet radiation is locally irradiated at two sites over ranges which penetrate from the left side face to the right side face of the cladding layer 2 with respect to the direction of propagation of light, and extend in the direction perpendicular to the direction of propagation of light. Material for composing the cladding layer 2 is preferably such as increasing the refractive index upon UV irradiation.

Figure 30B:
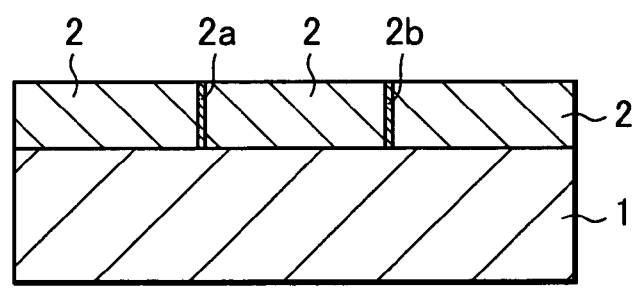

Next, as shown in FIG. 30B, the UV-irradiated portions cause denatured cladding layer portions 2a, 2b having an increased refractive index.

Figure 30C:
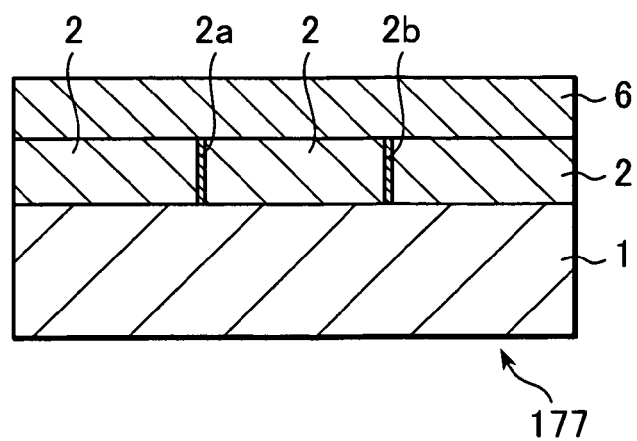

Next, as shown in FIG. 30C, on the cladding layer 2 having the denatured cladding layer portions 2a, 2b partially formed therein, the core layer 6 of predetermined thickness and width is formed, so as to form an optical waveguide 177.

In this example, the light coming through the incidence surface of the cladding layer 2 is prevented from propagating by the denatured cladding layer portions 2a, 2b which penetrate the cladding layer 2 from the left side face to the right side face thereof with respect to the direction of propagation of light, and extend in the direction perpendicular to the direction of propagation of light, and is never emitted from the emission surface side of the cladding layer 2. The denatured cladding layer portions 2a, 2b can be formed without providing the groove portions to the cladding layer 2, so that any process step of providing the groove portions is omissible.

Figure 31A:
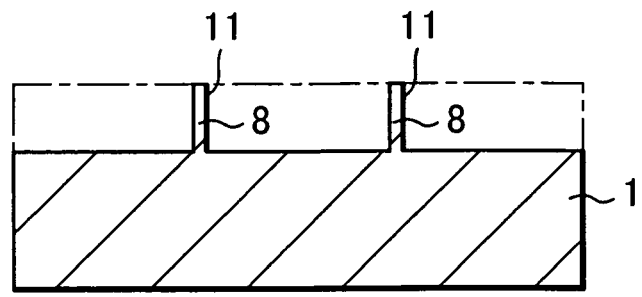
FIG. 31A to FIG. 31C are a sectional view explaining a fabrication step of an optical waveguide of still another example according to the same.

In an example shown in FIG. 31A, the substrate 1 of a predetermined thickness is formed, and the upper portion thereof is then partially removed to a thickness equivalent to that of the cladding layer 2 described later so as to form the groove portions 11, to thereby provide projected portions 8 at two sites. The projected portions 8 are provided over ranges which penetrate from the left side face to the right side face of the cladding layer 2 described later with respect to the direction of propagation of light, and extend in the direction perpendicular to the direction of propagation of light. Material for composing the substrate 1 and the projected portions 8 communicating therewith is preferably a metal, for example.

Figure 31B:
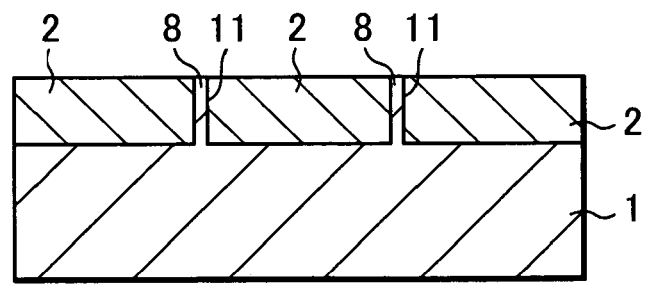

Next, as shown in FIG. 31B, a clad material is filled in the groove portions 11 on the substrate 1, to thereby obtain a structure in which the metal-made projected portions 8 are embedded in the cladding layer 2.

Figure 31C:
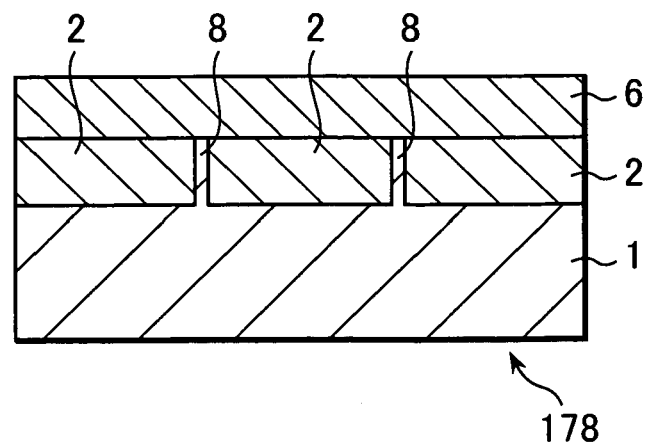

Next, as shown in FIG. 31C, on the cladding layer 2 having the projected portions 8 partially formed therein, the core layer 6 of predetermined thickness and width is formed, to thereby fabricate an optical waveguide 178.

In this example, the light coming through the incidence surface of the cladding layer 2 is prevented from propagating by the metal-made projected portions 8 which penetrate the cladding layer 2 from the left side face to the right side face thereof with respect to the direction of propagation of light, and extend in the direction perpendicular to the direction of propagation of light, and is never emitted from the emission surface side of the cladding layer 2. The projected portions 8 can be embedded without providing the groove portions to the cladding layer 2, and the light propagation preventive structure in the cladding layer 2 can be formed at the same time with formation of the substrate 1, so that any process steps of forming the groove portions or the like are omissible.

Figure 32A:
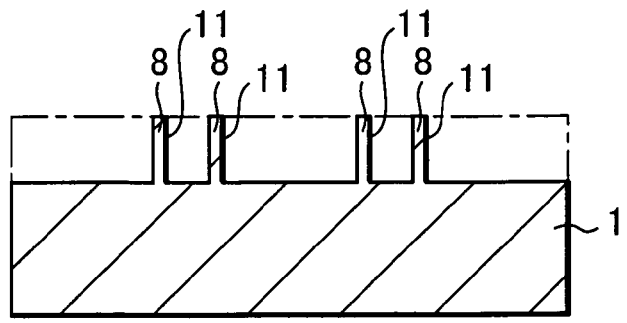
FIG. 32A to FIG. 32C are sectional views sequentially explaining fabrication steps of an optical waveguide of still another example according to the same.

In an example shown in FIG. 32A, the substrate 1 of a predetermined thickness is formed, and the upper portion thereof is then partially removed to a thickness equivalent to that of the cladding layer 2 described later so as to form the groove portions 11, to thereby provide projected portions 8 at four sites. The projected portions 8 are provided over ranges which penetrate from the left side face to the right side face of the cladding layer 2 described later with respect to the direction of propagation of light, and extend in the direction perpendicular to the direction of propagation of light. Material for composing the substrate 1 and the projected portions 8 communicating therewith is preferably a metal, for example.

Figure 32B:
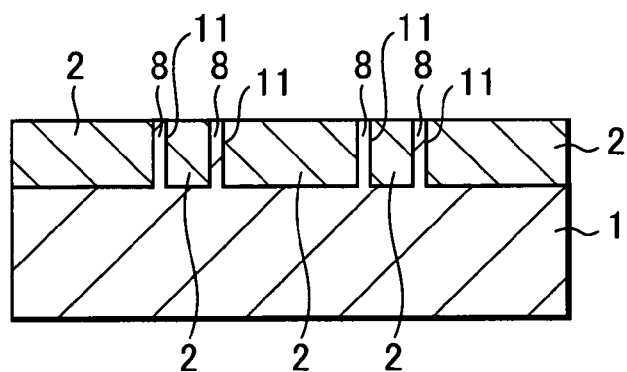

Next, as shown in FIG. 32B, a clad material is filled in the groove portions 11 on the substrate 1, to thereby obtain a structure in which the metal-made projected portions 8 are embedded in the cladding layer 2.

Figure 32C:
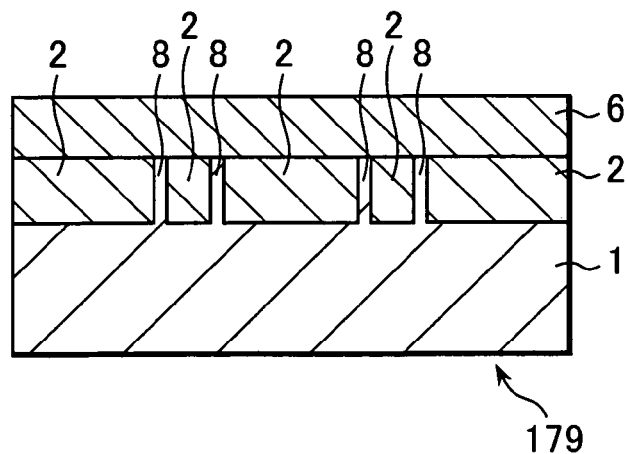

Next, as shown in FIG. 32C, on the cladding layer 2 having the projected portions 8 partially formed therein, the core layer 6 of predetermined thickness and width is formed, to thereby fabricate an optical waveguide 179.

In this example, the light coming through the incidence surface of the cladding layer 2 is prevented from propagating by the metal-made projected portions 8 which penetrate the cladding layer 2 from the left side face to the right side face thereof with respect to the direction of propagation of light, and extend in the direction perpendicular to the direction of propagation of light, and is never emitted from the emission surface side of the cladding layer 2. The projected portions 8 can be embedded without providing the groove portions to the cladding layer 2, and the light propagation preventive structure in the cladding layer 2 can be formed at the same time with formation of the substrate 1, so that any process steps of forming the groove portions or the like are omissible.

Figure 33A:
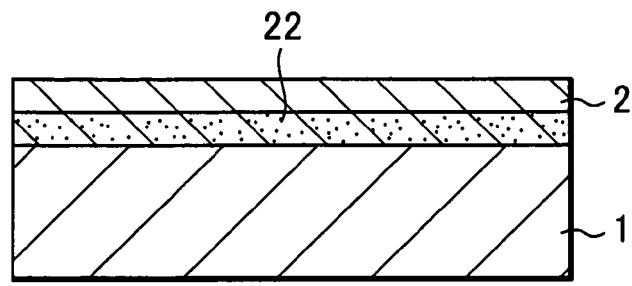
FIG. 33A to FIG. 33D are sectional views sequentially explaining fabrication steps of an optical waveguide of still another example according to the same.

In an example shown in FIG. 33A, the substrate 1 of a predetermined thickness is formed, a light absorbent containing layer 22 is formed thereon, and the cladding layer 2 of a predetermined thickness is further formed thereon. The light absorbent containing layer 22 is composed of a material containing a light absorbent mixed into a clad material.

Figure 33B:
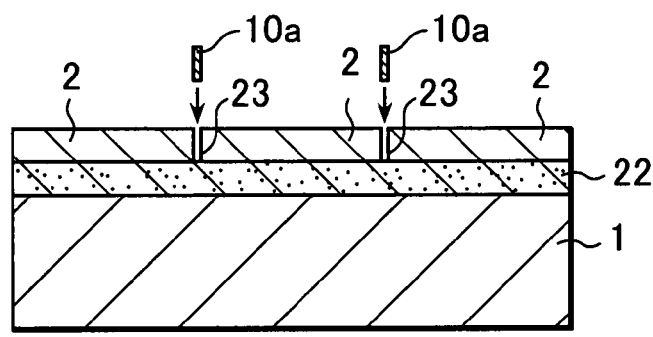

Next, as shown in FIG. 33B, groove portions 23 are provided at two predetermined sites so as to penetrate the cladding layer 2 from the left side face to the right side face thereof with respect to the direction of propagation of light, and so as to extend in the direction perpendicular to the direction of propagation of light.

Figure 33C:
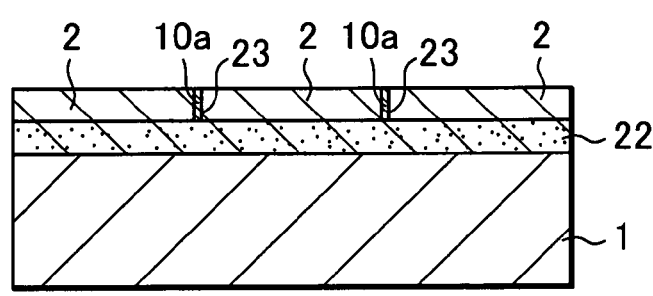

Next, as shown in FIG. 33C, the sheet-formed metal plates 10a having the same geometry as the groove portions 23 are inserted into the groove portion 23 from the top.

Figure 33D:
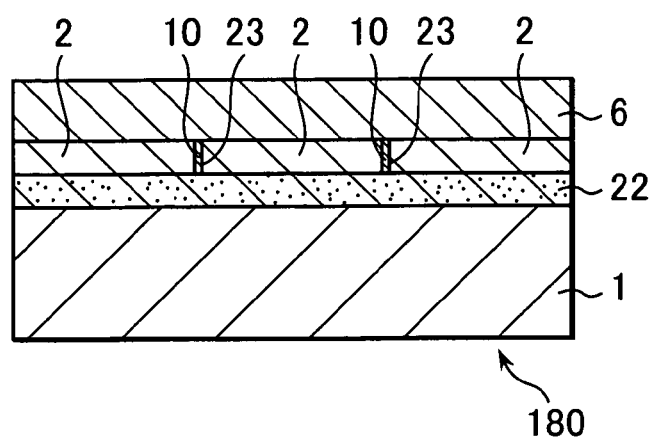

Next, as shown in FIG. 33D, on the cladding layer 2 having the metal plates 10a inserted therein, the core layer 6 of predetermined thickness and width is formed, to thereby fabricate an optical waveguide 180.

In this example, the light coming through the incidence surface of the light absorbent containing layer 22 is absorbed by the light absorbent contained in the light absorbent containing layer 22 so as to be prevented from propagating, and is never emitted from the emission surface side of the light absorbent containing layer 22. The light coming through the incidence surface of the cladding layer 2 is prevented from propagating by the metal plates 10a which penetrate the cladding layer 2 from the left side face to the right side face thereof with respect to the direction of propagation of light, and extend in the direction perpendicular to the direction of propagation of light, and is never emitted from the emission surface side of the cladding layer 2.

Figure 34A:
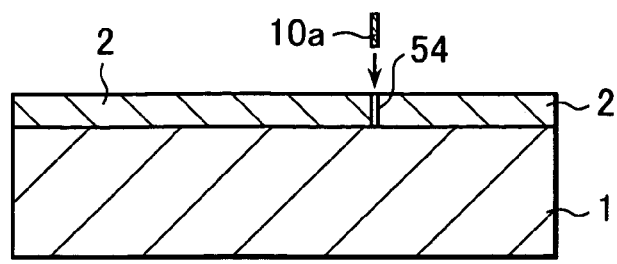
FIG. 34A to FIG. 34E are sectional views sequentially explaining fabrication steps of an optical waveguide of still another example according to the same.

In an example shown in FIG. 34A, the substrate 1 of a predetermined thickness is formed, the cladding layer 2 of a predetermined thickness is formed thereon, and a groove portion 54 is formed at a predetermined single site so as to penetrate the cladding layer 2 from the left side face to the right side face thereof with respect to the direction of propagation of light, and so as to extend in the direction perpendicular to the direction of propagation of light.

Figure 34B:
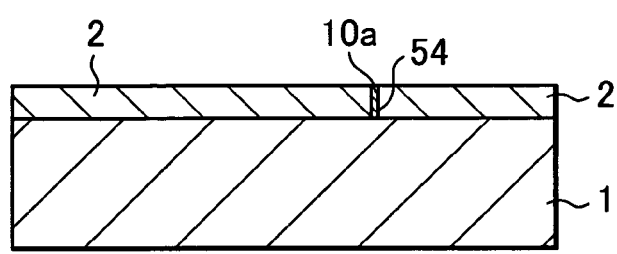

Next, as shown in FIG. 34B, the sheet-formed metal plate 10a having the same geometry as the groove portion 54 is inserted into the groove portion 54 from the top.

Figure 34C:
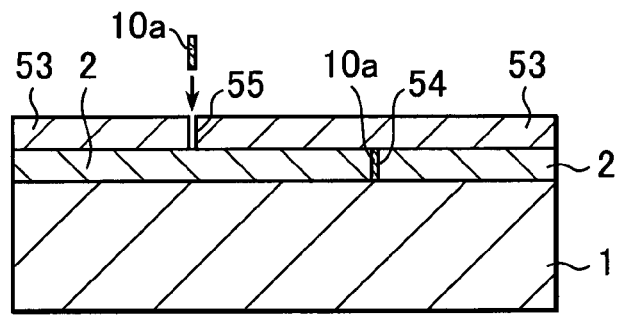

Next, as shown in FIG. 34C, on the cladding layer 2 having the metal plate 10a inserted in the groove portion 54 formed therein, a cladding layer 53 of a predetermined thickness is formed, and a groove portion 55 is formed at a predetermined single site different from the site of the groove portion 54, so as to penetrate the cladding layer 2 from the left side face to the right side face thereof with respect to the direction of propagation of light, and so as to extend in the direction perpendicular to the direction of propagation of light.

Figure 34D:
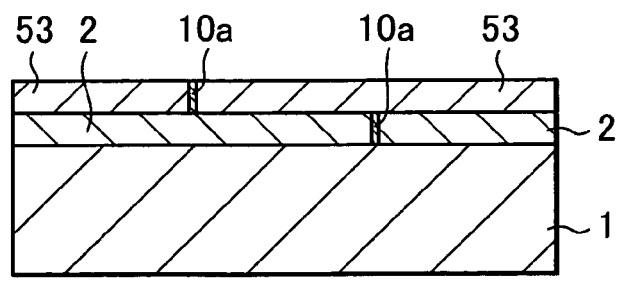

Next, as shown in FIG. 34D, the sheet-formed metal plate 10a having the same geometry as the groove portion 55 is inserted into the groove portion 55 from the top.

Figure 34E:
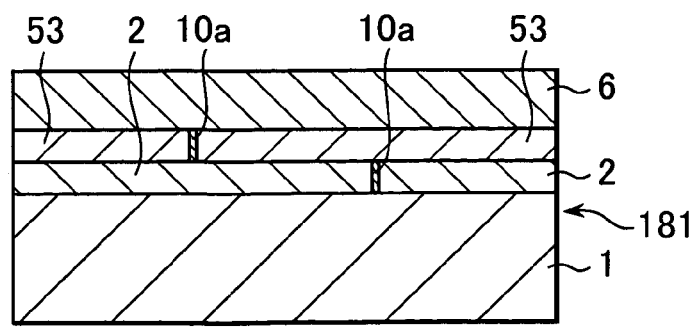

Next, as shown in FIG. 34E, on the cladding layer 53 having the metal plate 10a inserted therein, the core layer 6 of predetermined thickness and width is formed, to thereby fabricate an optical waveguide 181.

In this example, the light coming through the incidence surface of the cladding layer 2 is prevented from propagating by the metal plates 10a which penetrate the cladding layer 2 from the left side face to the right side face thereof with respect to the direction of propagation of light, and extend in the direction perpendicular to the direction of propagation of light, and is never emitted from the emission surface side of the cladding layer 2. Also the light coming through the incidence surface of the cladding layer 53 is prevented from propagating by the metal plates 10a which penetrate the cladding layer 53 from the left side face to the right side face thereof with respect to the direction of propagation of light, and extend in the direction perpendicular to the direction of propagation of light, and is never emitted from the emission surface side of the cladding layer 2.

FIG. 35 to FIG. 37 show other modified examples of the light propagation preventive structures in the cladding layer 2.

Figure 35A:
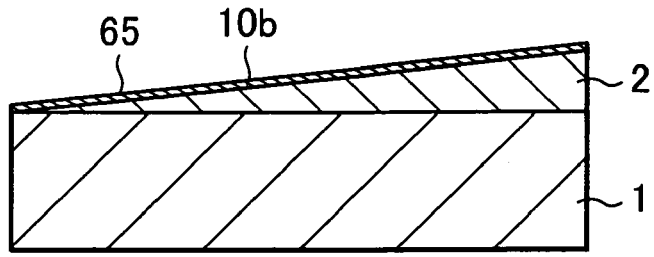
FIG. 35A to FIG. 35C are sectional views sequentially explaining fabrication steps of an optical waveguide of still another example according to the same.

First, as shown in FIG. 35A, the cladding layer 2 of a predetermined thickness is formed on the substrate of a predetermined thickness. In the formation of the cladding layer 2, the cladding layer 2 is formed so that the upper surface thereof configures an inclined surface 65 which rises up from the lower end on the incidence surface side towards the upper end on the emission surface side. Further on the inclined surface 65, a metal plate 10b of a predetermined thickness is provided.

Figure 35B:
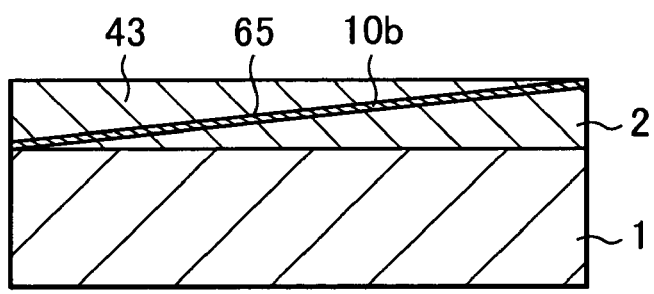

Next, as shown in FIG. 35B, a cladding layer 43 is formed on the metal plate 10b so as to make the top surface of this layer horizontal.

Figure 35C:
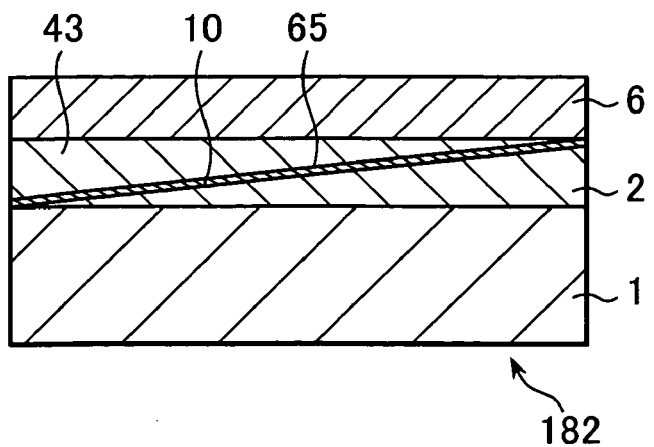

Next, as shown in FIG. 35C, the core layer 6 of predetermined thickness and width is formed on the cladding layer 43, to thereby fabricate an optical waveguide 182.

In this example, the light coming through the incidence surface of the cladding layer 43 is prevented from propagating by the metal plate 10b, and is never emitted from the emission surface side of the cladding layer 2. The metal plate 10b extending as being inclined in the cross direction with respect to the direction of propagation of light makes it possible to more effectively prevent the light propagation, by virtue of an increased area for reflecting the incident light coming through the incidence surface of the cladding layer 43. It is to be noted that better reflection characteristics can be obtained at the interface between the core layer 6 and the cladding layer 43, because there is substantially no metal plate 10b at the interface (the same will apply also to the examples below).

Figure 36A:
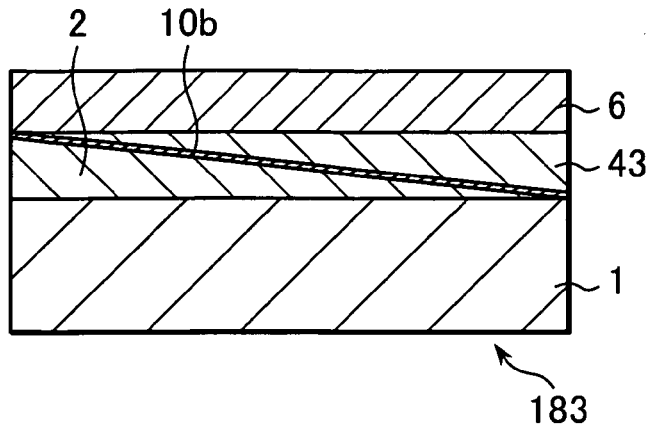
FIG. 36A to FIG. 36C are sectional views of optical waveguides of still other examples according to the same.

In an example shown in FIG. 36A, the cladding layer 2 of a predetermined thickness is provided on the substrate 1 of a predetermined thickness. In the formation of the cladding layer 2, the cladding layer 2 is formed so that the upper surface thereof configures an inclined surface 65 which falls from the upper end on the incidence surface side down to the lower end on the emission surface side. Further on the inclined surface 65, the metal plate 10b of a predetermined thickness is provided. Further on the metal plate 10b, the cladding layer 43 is formed so as to make the top surface thereof horizontal, and on the cladding layer 43, the core layer 6 of predetermined thickness and width is formed, to thereby fabricate an optical waveguide 183.

In this example, the light coming through the incidence surface of the cladding layer 2 is prevented from propagating by the metal plate 10b, and is never emitted from the emission surface side of the cladding layer 43. The metal plate 10b extending as being inclined in the vertical direction with respect to the direction of propagation of light makes it possible to more effectively prevent the light propagation, by virtue of an increased area for reflecting the incident light coming through the incidence surface of the cladding layer 2.

Figure 36B:
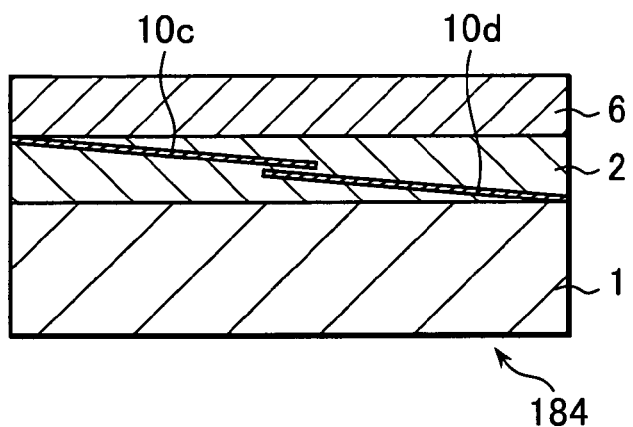

In the next example shown in FIG. 36B, the cladding layer 2 is formed on the substrate 1 of a predetermined thickness, in which the cladding layer 2 has, as being formed therein, a metal plate 10c disposed so as to be inclined from the upper end on the incidence surface side down towards the emission surface side in the direction of propagation of light, and a metal plate 10d disposed so as to be inclined down towards the lower end on the emission surface side in the direction of propagation of light.

The metal plate 10c and the metal plate 10d are arranged so as to overlap with each other in the direction of propagation of light but not in contact with each other, in which the metal plate 10c is formed so as to be located above the metal plate 10d, to thereby fabricate an optical waveguide 184.

In this example, the light coming through the incidence surface of the cladding layer 2 is prevented from propagating by the metal plates 10c and 10d, and is never emitted from the emission surface side of the cladding layer 2. The metal plates 10c and 10d extending as being inclined in the direction of propagation of light makes it possible to more effectively prevent the light propagation, by virtue of an increased area for reflecting the incident light coming through the incidence surface of the cladding layer 2.

Figure 36C:
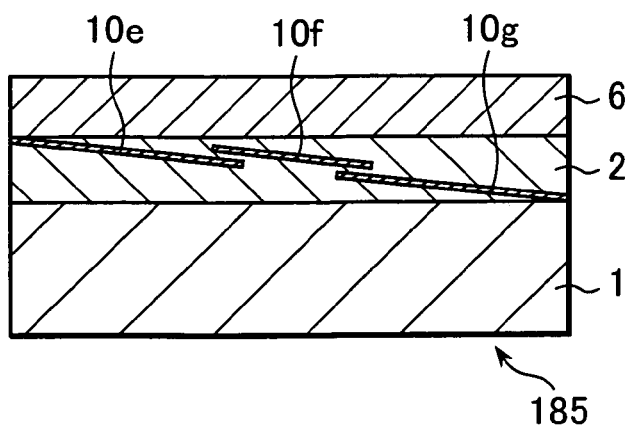

In the next example shown in FIG. 36C, the cladding layer 2 is formed on the substrate 1 of a predetermined thickness, in which the cladding layer 2 has, as being formed therein, a metal plate 10e disposed so as to be inclined from the upper end on the incidence surface side down towards the emission surface side with respect to the direction of propagation of light; a metal plate 10f disposed inside the cladding layer 2 so as to be inclined further downward with respect to the direction of propagation of light; and a metal plate 10g disposed so as to be inclined still further down towards the lower end on the emission surface side with respect to the direction of propagation of light.

The metal plate 10e, the metal plate 10f and the metal plate 10g are arranged so as to overlap with each other in the direction of propagation of light but not in contact with each other, in which the metal plate 10f is formed so as to be located above the metal plate 10e and the metal plate 10g, to thereby fabricate an optical waveguide 185.

In this example, the light coming through the incidence surface of the cladding layer 2 is prevented from propagating sequentially by the metal plates 10e, 10f and 10 g, and is never emitted from the emission surface side of the cladding layer 2. The metal plates 10e, 10f and 10g extending as being inclined with respect to the direction of propagation of light makes it possible to more effectively prevent the light propagation, by virtue of an increased area for reflecting the incident light coming through the incidence surface of the cladding layer 2.

Figure 37A:
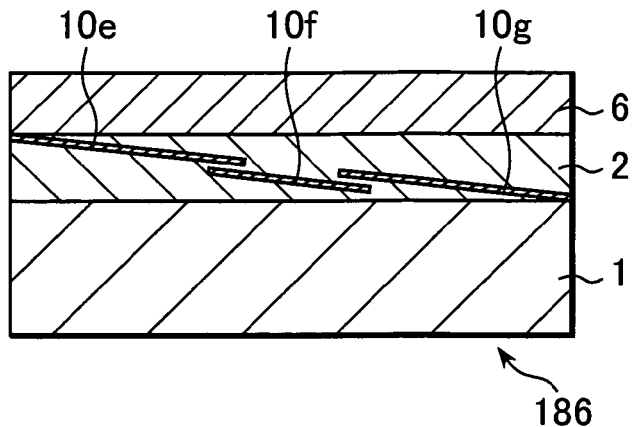

In the next example shown in FIG. 37A, the cladding layer 2 is formed on the substrate 1 of a predetermined thickness, in which the cladding layer 2 has, as being formed therein, the metal plate 10e disposed so as to be inclined from the upper end on the incidence surface side down towards the emission surface side with respect to the direction of propagation of light; the metal plate 10f disposed inside the cladding layer 2 so as to be inclined further downward with respect to the direction of propagation of light; and the metal plate 10g disposed so as to be inclined still further down towards the lower end on the emission surface side with respect to the direction of propagation of light.

The metal plate 10e, the metal plate 10f and the metal plate 10g are arranged so as to overlap with each other in the direction of propagation of light but not in contact with each other, in which the metal plate 10f is formed so as to be located below the metal plate 10e and the metal plate 10g, to thereby fabricate an optical waveguide 186.

In this example, the light coming through the incidence surface of the cladding layer 2 is prevented from propagating sequentially by the metal plates 10e, 10f and 10g, and is never emitted from the emission surface side of the cladding layer 2. The metal plates 10e, 10f and 10g extending as being inclined with respect to the direction of propagation of light makes it possible to more effectively prevent the light propagation, by virtue of an increased area for reflecting the incident light coming through the incidence surface of the cladding layer 2.

Figure 37B:
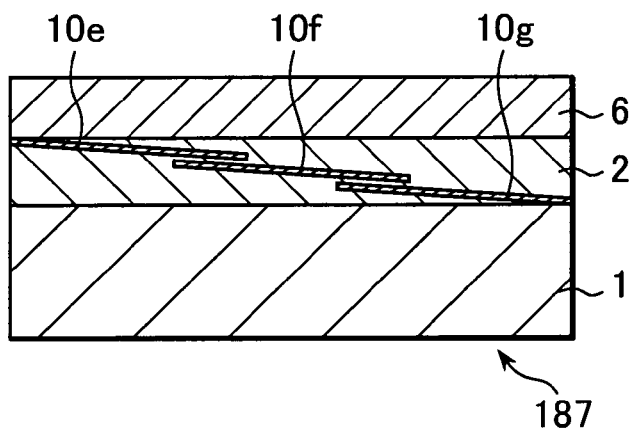

In the next example shown in FIG. 37B, the cladding layer 2 is formed on the substrate 1 of a predetermined thickness, in which the cladding layer 2 has, as being formed therein, the metal plate 10e disposed so as to be inclined from the upper end on the incidence surface side down towards the emission surface side with respect to the direction of propagation of light; the metal plate 10f disposed inside the cladding layer 2 so as to be inclined further downward with respect to the direction of propagation of light; and the metal plate 10g disposed so as to be inclined still further down towards the lower end on the emission surface side with respect to the direction of propagation of light.

The metal plate 10e, the metal plate 10f and the metal plate 10g are arranged so as to overlap with each other in the direction of propagation of light but not in contact with each other, in which the metal plate 10f is formed so as to be located between the metal plate 10e and the metal plate 10g, to thereby fabricate an optical waveguide 187.

In this example, the light coming through the incidence surface of the cladding layer 2 is prevented from propagating sequentially by the metal plates 10e, 10f and 10g, and is never emitted from the emission surface side of the cladding layer 2. The metal plates 10e, 10f and 10g extending as being inclined with respect to the direction of propagation of light makes it possible to more effectively prevent the light propagation, by virtue of an increased area for reflecting the incident light coming through the incidence surface of the cladding layer 2.

Figure 37C:
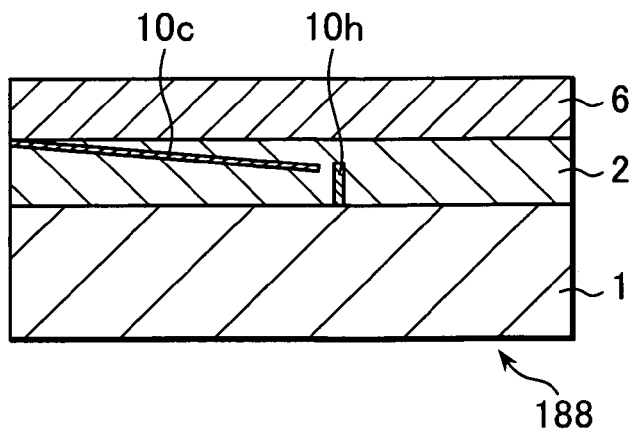

An example shown in FIG. 37C, the cladding layer 2 is formed on the substrate 1 of a predetermined thickness, in which the cladding layer 2 has, as being formed therein, the metal plate 10c disposed so as to be inclined from the upper end on the incidence surface side down towards the emission surface side with respect to the direction of propagation of light; and a metal plate 10h disposed behind the metal plate 10c, and extends from the substrate 1 up to the middle portion of the cladding layer 2.

The metal plate 10c and the metal plate 10h are arranged so as to overlap with each other with respect to the direction of propagation of light but not in contact with each other, to thereby fabricate an optical waveguide 188.

In this example, the light coming through the incidence surface of the cladding layer 2 is prevented from propagating sequentially by the metal plates 10c and 10h, and is never emitted from the emission surface side of the cladding layer 2. The metal plate 10c extending as being inclined with respect to the direction of propagation of light makes it possible to more effectively prevent the light propagation, by virtue of an increased area for reflecting the incident light coming through the incidence surface of the cladding layer 2.

Figure 38:
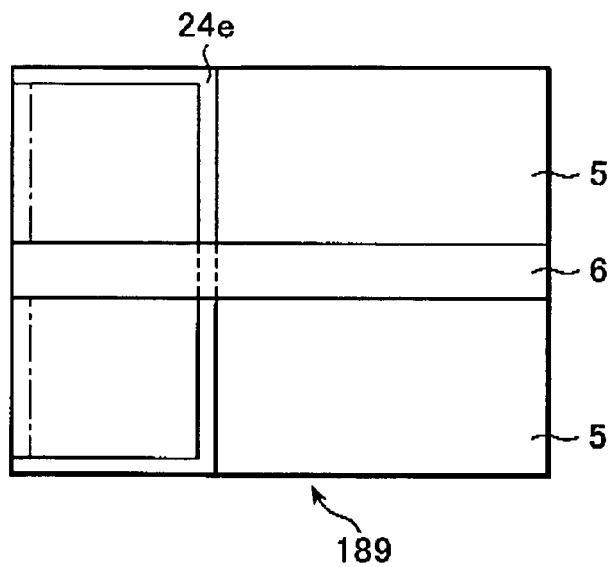
FIG. 38 is a plan view of an optical waveguide of still another example according to the same.
Figure 39A:
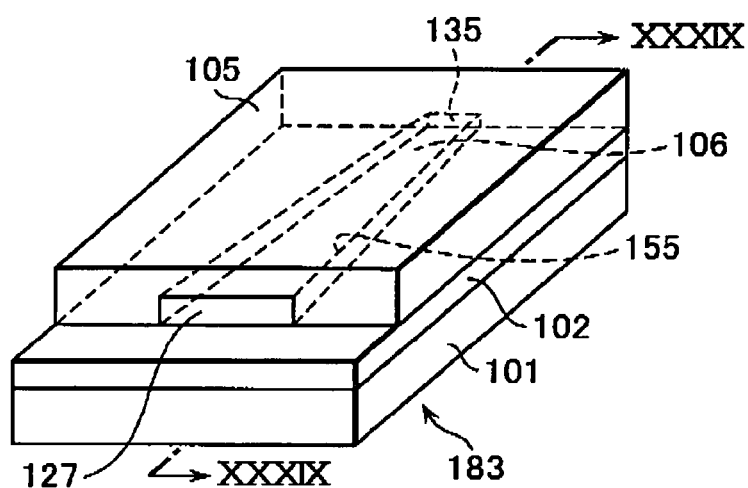
FIG. 39A is a perspective view taken along a line XXXIX—XXXIX in FIG. 39B.
Figure 39B:
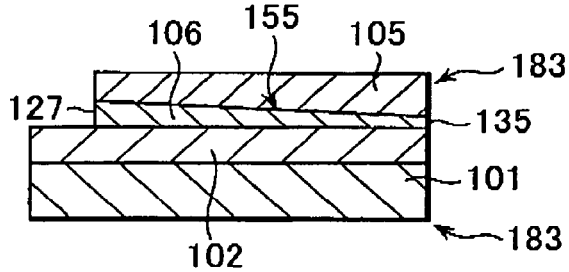
FIG. 39B is a sectional view.
Figure 39C:
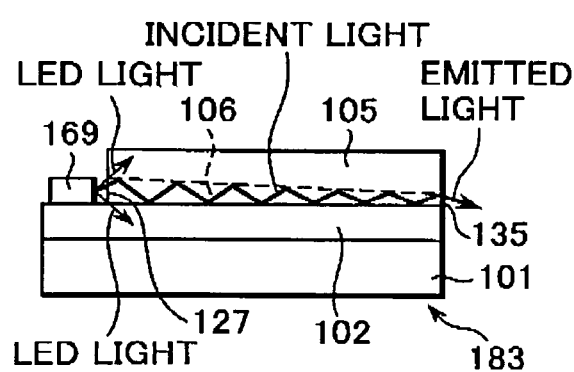
FIG. 39C is a side elevation of an optical waveguide according to a related art example.
Figure 40:
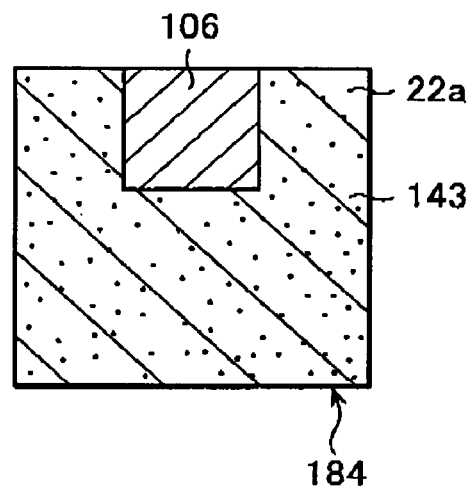
FIG. 40 is a sectional view of the optical waveguide of still another related art example according to the same.
Figure 41:
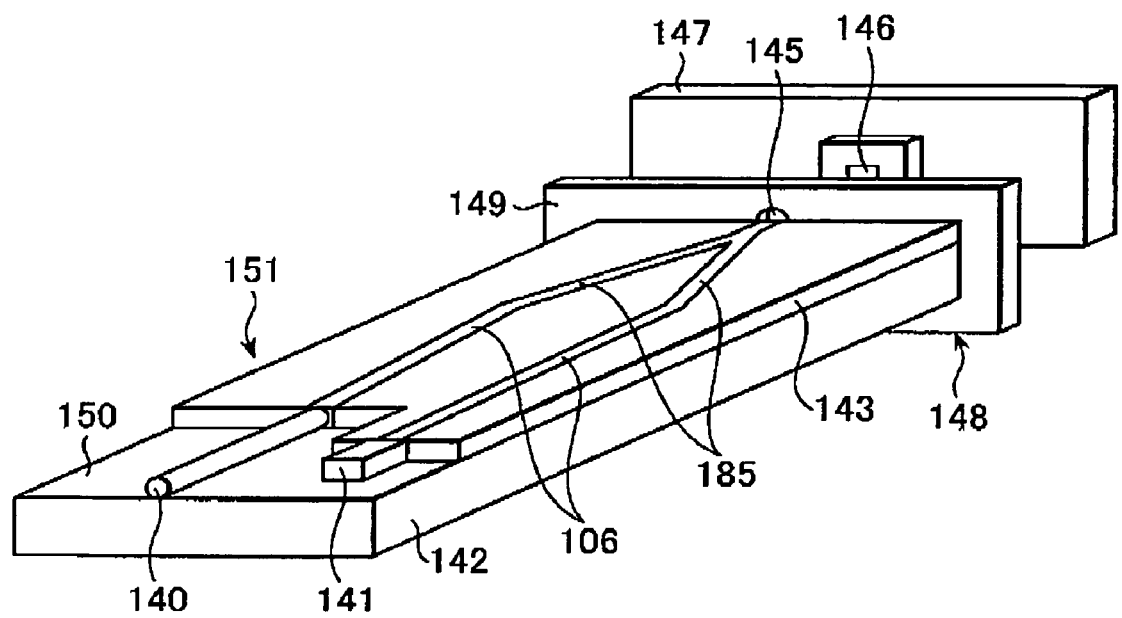
FIG. 41 is a perspective view of the optical waveguide of still another related art example according to the same.

In an optical waveguide 189 shown in FIG. 38, a metal layer 24e is formed so as to extend from one side faces towards the other side faces of the cladding layer 2 and the cladding layer 5 in the direction perpendicular to the direction of propagation of light, and at the same time, so as to extend towards the corner portions of the incidence surface, to thereby have a nearly U-shape as a whole, in order to prevent the propagation of light in the cladding layer 2 and the cladding layer 5.

In this example, the light coming through the incidence surface of the cladding layer 2 is prevented from propagating by the metal layer 24e, and this makes it possible to prevent propagation of light not only in the direction of propagation of light, but also in the direction outward from the cladding layer 2. Provision of the metal plate on the incidence surface side except for the portion of the core layer 6, as indicated by the chain line, also makes it possible to directly intercept the light possibly incident to the cladding layer 2.

Any other operations and effects obtainable in the present embodiment are same as those described in the foregoing first embodiment.

The above-described embodiments can be modified in various ways based on the technical spirit of the present invention.

For example, geometry, size, number of disposition, sites of disposition, materials, thickness and so forth of the substrate, individual cladding layers, individual light sources, individual metal layers, and individual metal plates may be modified in various manners so far as the desired effect can be realized. In particular, the number of the metal layers may be one, and the number thereof, size and so forth may be modified in various ways.

Also the compositional materials and layer configuration of the optical waveguide may be modified in various ways. For example, a core layer equivalent to the core layer described in the above can be formed by using an inorganic material such as lithium niobate, wherein a film of this material is formed as a core member on the substrate by the CVD (chemical vapor deposition) process, and the film is then etched through a resist mask into a predetermined pattern. It is also allowable to form the cladding layer in a geometry equivalent to that of the trapezoidal core layer.

It is still also allowable that the geometry of the core layer of the optical waveguide may be not only such as having the straight inclined surface on the end surface in the width-wise direction, but also such as having a curved inclined surface on the end surface in the width-wise direction. The core layer may be fabricated by using a molding die.

Configuration of an optical system involving the above-described optical waveguide may properly be modified, such as, for example, adopting a micro-mirror device or a polygon mirror as a scanning means, or such as causing projection onto a screen.

The present invention is applicable not only to displays using LEDs as light sources, but also widely applicable to various optical information processing apparatuses typically used for optical communication, configured so as to allow a signal light using laser from an optical waveguide to enter a light-receiving element (optical interconnection, photo-detector, etc.) of a circuit in the succeeding stage.

What is claimed is:

1. An optical waveguide comprising a bonded member of a core layer and a cladding layer, and being configured so as to guide a portion of an incident light coming into said core layer towards a light emission side thereof, wherein:

a light propagation preventive means for preventing a portion of an incident light coming into said cladding layer from propagating therethrough towards the light emission side of the optical waveguide is formed in said cladding layer, and wherein said light propagation preventive means is provided partially between opposing edges or on a diagonal line between opposing angles in a width-wise direction and a thickness-wise direction of said cladding layer, and wherein said light propagation preventive means being provided partially comprises a first continuous layer extending respectively from said opposing edges or from said opposing angles, and a second continuous layer provided inside said opposing edges, so that said first and second continuous layers overlap with each other with respect to a direction of propagation of light.

* * * * *